United States Patent
Lee et al.

(10) Patent No.: US 10,931,389 B2
(45) Date of Patent: Feb. 23, 2021

(54) METHOD OF OPERATING TERMINAL AND BASE STATION IN WIRELESS COMMUNICATION SYSTEM AND APPARATUS SUPPORTING SAME

(71) Applicant: LG Electronics Inc., Seoul (KR)

(72) Inventors: Kilbom Lee, Seoul (KR); Jiwon Kang, Seoul (KR); Kijun Kim, Seoul (KR); Jonghyun Park, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/775,476

(22) Filed: Jan. 29, 2020

(65) Prior Publication Data

US 2020/0235832 A1   Jul. 23, 2020

Related U.S. Application Data

(63) Continuation of application No. PCT/KR2019/011552, filed on Sep. 6, 2019.

(30) Foreign Application Priority Data

Sep. 6, 2018   (KR) .................. 10-2018-0106771

(51) Int. Cl.
  *H04B 17/336*   (2015.01)
  *H04B 17/345*   (2015.01)
  *H04L 27/26*    (2006.01)
  *H04W 24/10*    (2009.01)

(52) U.S. Cl.
  CPC ......... *H04B 17/336* (2015.01); *H04B 17/345* (2015.01); *H04L 27/2602* (2013.01); *H04W 24/10* (2013.01)

(58) Field of Classification Search
  None
  See application file for complete search history.

(56) References Cited

U.S. PATENT DOCUMENTS

2011/0273997 A1\*  11/2011  Sumasu ............... H04L 5/1469
                                                370/252
2016/0294526 A1    10/2016  Kim et al.
2017/0047976 A1\*   2/2017  Noh .................... H04B 7/0626
                        (Continued)

FOREIGN PATENT DOCUMENTS

WO    WO2017171523     10/2017

OTHER PUBLICATIONS

Huawei, HiSilicon, "Beam measurement and reporting using L1-RSRQ and SINR," R1-1809123, 3GPP TSG RAN WG1 Meeting #94, Gothenburg, Sweden, dated Aug. 20-24, 2018, 3 pages.
(Continued)

*Primary Examiner* — Lonnie V Sweet
(74) *Attorney, Agent, or Firm* — Fish & Richardson P.C.

(57) ABSTRACT

Disclosed herein are a method of operating a terminal and a base station in a wireless communication system and an apparatus supporting the same. According to an embodiment applicable to the present disclosure, a signal to interference noise ratio (SINR) report may be configured for the terminal, and an SINR report reported to the base station by the terminal based on the configuration may be calculated differently based on configuration of an interference measurement resource for the terminal.

13 Claims, 16 Drawing Sheets

(56) References Cited

U.S. PATENT DOCUMENTS

| | | | |
|---|---|---|---|
| 2018/0020035 A1* | 1/2018 | Boggia | H04L 65/80 |
| 2019/0053089 A1* | 2/2019 | Kwak | H04W 24/10 |
| 2019/0349103 A1* | 11/2019 | Wang | H04B 7/0626 |
| 2019/0356364 A1* | 11/2019 | Maamari | H04L 5/0062 |
| 2020/0067614 A1* | 2/2020 | Wang | H04J 11/0023 |

OTHER PUBLICATIONS

Intel Corporation, "On Interference-aware Beam Measurement and Reporting," R1-1808721, 3GPP TSG RAN WG1 Meeting #94, Gothenburg, Sweden, dated Aug. 20-24, 2018, 4 pages.

Intel Corporation, "Remaining Issues on Interference Measurement for CSI," R1-1720069, 3GPP TSG-RAN WG1 Meeting #91, Reno, USA, Nov. 27-Dec. 1, 2017, 4 pages.

* cited by examiner

METHOD OF OPERATING TERMINAL AND BASE STATION IN WIRELESS COMMUNICATION SYSTEM AND APPARATUS SUPPORTING SAME

CROSS-REFERENCE TO RELATED APPLICATIONS

This application is a continuation of International Application No. PCT/KR2019/011552, filed on Sep. 6, 2019, which claims priority under 35 U.S.C. 119(a) to Korean Patent Application No. 10-2018-0106771, filed on Sep. 6, 2018, which is hereby incorporated by reference herein in their entirety.

TECHNICAL FIELD

The following description relates to a wireless communication system, and more particularly, to a method of operating a terminal and a base station in relation to an operation of reporting a signal to interference noise ratio (SINR) related to a specific reference signal (e.g., a channel state information-reference signal (CSI-RS), etc.) in a wireless communication system, and an apparatus supporting the same.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

In particular, as more and more communication devices require a larger communication capacities, mobile broadband communication technology improved over the conventional radio access technology (RAT) has been proposed. In addition, massive Machine Type Communications (MTC), which provide various services anywhere anytime by connecting many devices and objects, and a communication system considering a service/UE that are sensitive to reliability and latency have been proposed. Accordingly, improved mobile broadband communication, massive MTC, Ultra-Reliable and Low Latency Communication (URLLC), etc. have been introduced, and various technical configurations therefor have been proposed.

SUMMARY

In the present disclosure, a method of operating a terminal and a base station in a wireless communication system and apparatuses supporting the same are provided.

It will be understood by persons skilled in the art that the objects that can be achieved with the present disclosure are not limited to what has been particularly described hereinabove and other objects will be more clearly understood from the following detailed description.

The present disclosure provides an operation method of a terminal and a base station in a wireless communication system, and apparatuses therefor.

In an example of the present disclosure, a method for operation of a user equipment (UE) in a wireless communication system may include receiving a signal to interference noise ratio (SINR) report configuration from a base station, based on the SINR report configuration, (i) based on that an interference measurement resource related to a channel measurement reference signal resource is configured for the UE, calculating an SINR related to the channel measurement reference signal resource based on a first interference measurement result calculated based on the interference measurement resource, or (ii) based on that the interference measurement resource related to the channel measurement reference signal resource is not configured for the UE, calculating an SINR related to the channel measurement reference signal resource based on a second interference measurement result calculated based on the channel measurement reference signal resource, and reporting the calculated SINR to the base station.

Herein, the SINR report configuration may be received via a higher layer signaling.

In the present disclosure, a non-zero power channel state information-reference signal (NZP CSI-RS) or a synchronization signal/physical broadcast channel block received through the channel measurement reference signal resource may be included, wherein the interference measurement resource may include a zero power (ZP) interference measurement resource or a non-zero interference measurement resource.

In the present disclosure, the channel measurement reference signal resource and the interference measurement resource may be configured on one orthogonal frequency division multiplexing (OFDM) symbol.

Herein, the channel measurement reference signal resource and the interference measurement resource may be configured on the one OFDM symbol based on a frequency division multiplexing (FDM) scheme.

In the present disclosure, the calculating of the SINR related to the channel measurement reference signal resource by the UE based on the first interference measurement result calculated based on the interference measurement resource may include calculating, by the UE, an SINR related to the channel measurement reference signal resource based on the first interference measurement result on an assumption that a reference signal received through the channel measurement reference signal resource is repeatedly transmitted once on the one OFDM symbol in the time domain.

In the present disclosure, the calculating of the SINR related to the channel measurement reference signal resource by the UE based on the second interference measurement result calculated based on the channel measurement reference signal resource based on that the interference measurement resource is not configured for the UE may include performing channel estimation based on the channel measurement reference signal resource, calculating the second interference measurement result by removing a desired signal detected through the channel estimation from the channel measurement reference signal resource, and calculating the SINR related to the channel measurement reference signal resource based on the second interference measurement result.

Herein the channel measurement reference signal resource may be configured on at least three subcarriers in one resource block (RB) based on that the interference measurement resource is not configured for the UE.

Alternatively, the channel measurement reference signal resource may be configured on a plurality of resource elements (REs) having a constant resource element (RE) interval on one orthogonal frequency division multiplexing (OFDM) symbol based on that the interference measurement resource is not configured for the UE.

In the present disclosure, the SINR may include a first layer (L1)-SINR.

In another example of the present disclosure, a UE operating in a wireless communication system may include at least one transmitter, at least one receiver, at least one processor, and at least one memory operatively coupled to the at least one processor, the at least one memory storing instructions configured to cause, when executed, the at least one processor to perform a specific operation, wherein the specific operation may include receiving a signal to interference noise ratio (SINR) report configuration from a base station, based on the SINR report configuration (i) based on that an interference measurement resource related to a channel measurement reference signal resource is configured for the UE, calculating an SINR related to the channel measurement reference signal resource based on a first interference measurement result calculated based on the interference measurement resource, or (ii) based on that the interference measurement resource related to the channel measurement reference signal resource is not configured for the UE, calculating an SINR related to the channel measurement reference signal resource based on a second interference measurement result calculated based on the channel measurement reference signal resource, and reporting the calculated SINR to the base station.

The UE may communicate with at least one of a mobile terminal, a network, or an autonomous vehicle other than a vehicle comprising the UE.

In another example of the present disclosure, a base station operating in a wireless communication system may include at least one transmitter, at least one receiver, at least one processor, and at least one memory operatively coupled to the at least one processor, the at least one memory storing instructions configured to cause, when executed, the at least one processor to perform a specific operation, wherein the specific operation may include transmitting a signal to interference noise ratio (SINR) report configuration to a UE, transmitting a reference signal to the UE through a channel measurement reference signal resource, and receiving an SINR report related to the channel measurement reference signal resource from the UE based on the SINR report configuration transmitted to the UE, wherein the received SINR report may be calculated based on (i) a first interference measurement result calculated based on an interference measurement resource related to the channel measurement reference signal resource based on that the interference measurement resource is configured for the UE, or (ii) a second interference measurement result calculated based on a reference signal resource for receiving the reference signal, based on that the interference measurement resource related to the channel measurement reference signal resource is not configured for the UE.

It is to be understood that both the foregoing general description and the following detailed description of the present disclosure are exemplary and explanatory and are intended to provide further explanation of the disclosure as claimed.

As is apparent from the above description, the embodiments of the present disclosure have the following effects.

According to the present disclosure, the UE may calculate and report an SINR related to a specific reference signal with different methods, based on configuration of a separate resource for interference measurement for the UE.

In other words, the UE may calculate and report an SINR with different methods, based on configuration of an interference measurement resource for SINR report for the UE.

In response, the base station may recognize that the received SINR information is calculated based on a different method, based on the configuration of an interference measurement resource for SINR report for the UE. In addition, the base station may manage/schedule the UE based on the received SINR information.

The effects obtainable in the embodiments of the present disclosure are not limited to the above-mentioned effects, and other effects that are not mentioned may be clearly derived and understood by those skilled in the art to which the technical configuration of the present disclosure applies from the following description of the embodiments of the present disclosure.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

DETAILED DESCRIPTION

Figure 1:
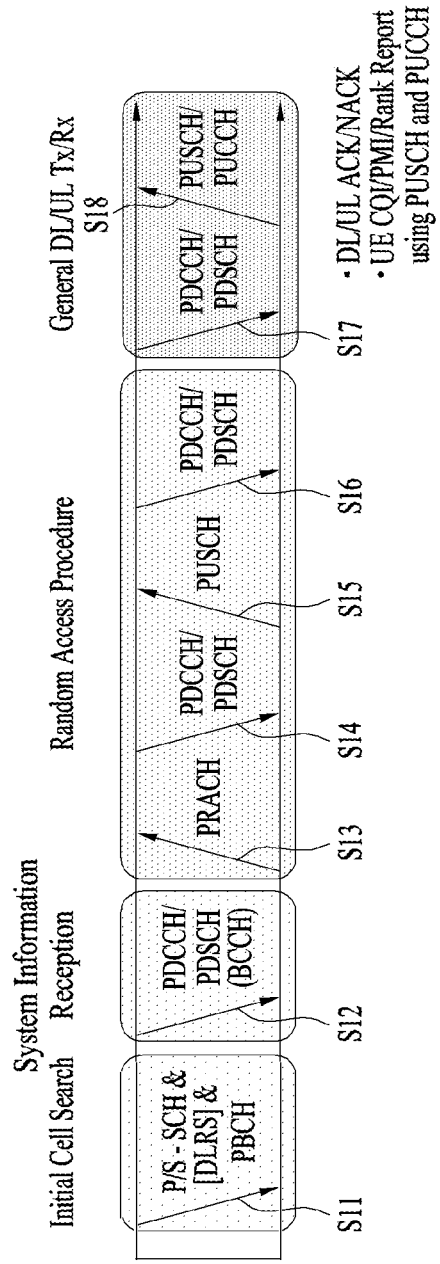
FIG. 1 is a diagram illustrating physical channels and a general signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a UE node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term UE may be replaced with a UE, a Mobile Station (MS), a Subscriber Station (SS), a Mobile Subscriber Station (MSS), a mobile UE, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Hereinafter, preferred embodiments of the present disclosure will be described in detail with reference to the accompanying drawings. The detailed description, which will be given below with reference to the accompanying drawings, is intended to explain exemplary embodiments of the present disclosure and is not intended to represent the only embodiments in which the technical configuration of the present disclosure may be practiced.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR system is explained, which are examples of wireless access systems.

Technology described below may be applied to various wireless access systems such as code division multiple access (CDMA), frequency division multiple access (FDMA), time division multiple access (TDMA), orthogonal frequency division multiple access (OFDMA), and single carrier frequency division multiple access (SC-FDMA).

To clarify technical features of the present disclosure, embodiments of the present disclosure are described focusing upon a 3GPP NR system. However, the embodiments proposed in the present disclosure may be equally applied to other wireless systems (e.g., 3GPP LTE, IEEE 802.16, and IEEE 802.11).

1. NR System 1.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

A UE performs initial cell search such as synchronization establishment with a BS in step S11 when the UE is powered on or enters a new cell. To this end, the UE may receive a primary synchronization channel (P-SCH) and a secondary synchronization channel (S-SCH) from the BS, establish synchronization with the BS, and acquire information such as a cell identity (ID).

Thereafter, the UE may receive a physical broadcast channel (PBCH) from the BS to acquire broadcast information in the cell.

Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S12.

Next, the UE may perform a random access procedure such as steps S13 to S16 to complete access to the BS. To this end, the UE may transmit a preamble through a physical random access channel (PRACH) (S13) and receive a random access response (RAR) to the preamble through the PDCCH and the PDSCH corresponding to the PDCCH (S14). The UE may transmit a physical uplink shared channel (PUSCH). In the case of contention-based random access, a contention resolution procedure including transmission of a PRACH signal (S15) and reception of a PDCCH signal and a PDSCH signal corresponding to the PDCCH signal (S16) may be additionally performed.

The UE which has performed the above procedures may receive a PDCCH signal and/or a PDSCH signal (S17) and transmit a PUSCH signal and/or a physical uplink control channel (PUCCH) signal (S18) as a general UL/DL signal transmission procedure.

Control information that the UE transmits to the BS is referred to as uplink control information (UCI). The UCI includes a hybrid automatic repeat and request (HARD) acknowledgement (ACK)/negative ACK (NACK) signal, a scheduling request (SR), a channel quality indicator (CQI), a precoding matrix index (PMI), a rank indicator (RI), or beam indication (BI) information.

In an NR system, the UCI is generally periodically transmitted on the PUCCH. However, according to an embodiment (if control information and traffic data should be transmitted simultaneously), the control information and traffic data may be transmitted on the PUSCH. In addition, the UCI may be transmitted aperiodically on the PUSCH, upon receipt of a request/command from a network.

1.2. Radio Frame Structure

Figure 2:
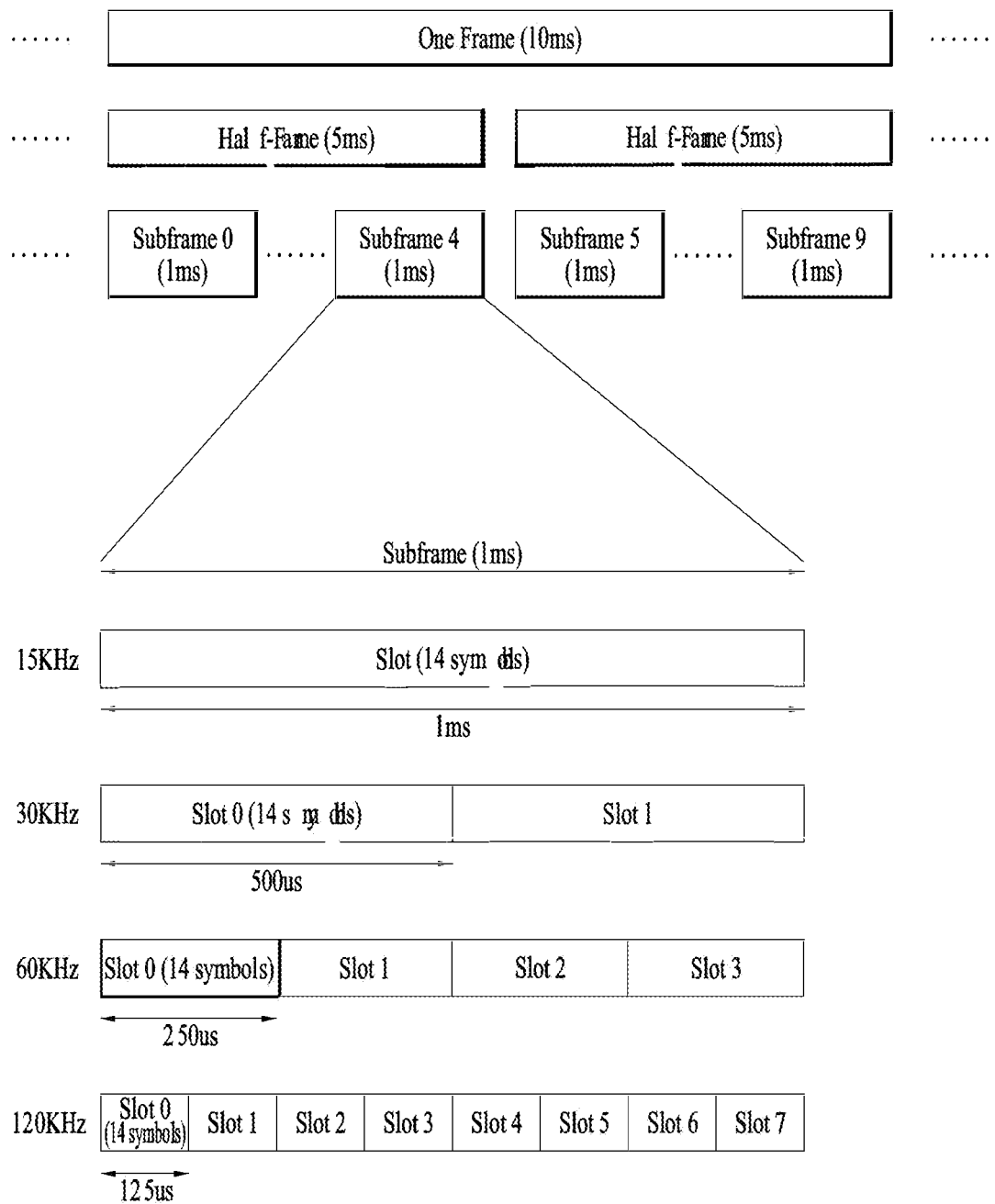
FIG. 2 is a diagram illustrating a radio frame structure in an NR system to which embodiments of the present disclosure are applicable.

FIG. 2 is a diagram illustrating a radio frame structure in an NR system to which embodiments of the present disclosure are applicable.

Figure 5:
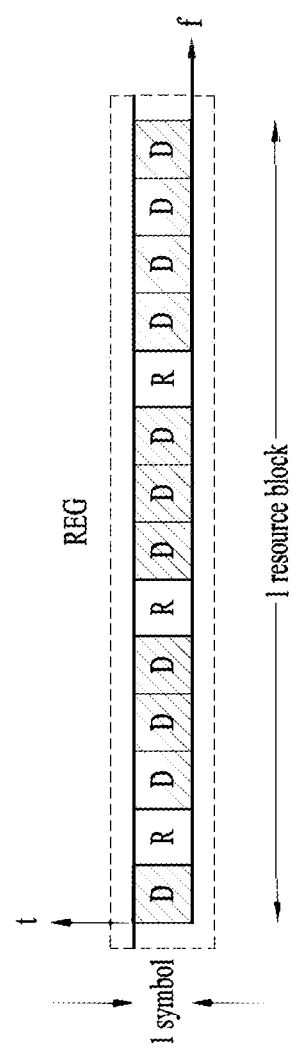
FIG. 5 is a diagram illustrating the structure of one REG in an NR system to which embodiments of the present disclosure are applicable.

In the NR system, UL and DL transmissions are based on a frame as illustrated in FIG. 5. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM) symbol and an SC-FDMA symbol (or a DFT-s-OFDM symbol).

Table 1 lists the number of symbols per slot, the number of slots per frame, and the number of slots per subframe in the normal CP case, and Table 2 lists the number of symbols per slot, the number of slots per frame, and the number of slots per subframe in the extended CP case.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| μ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

Figure 3:
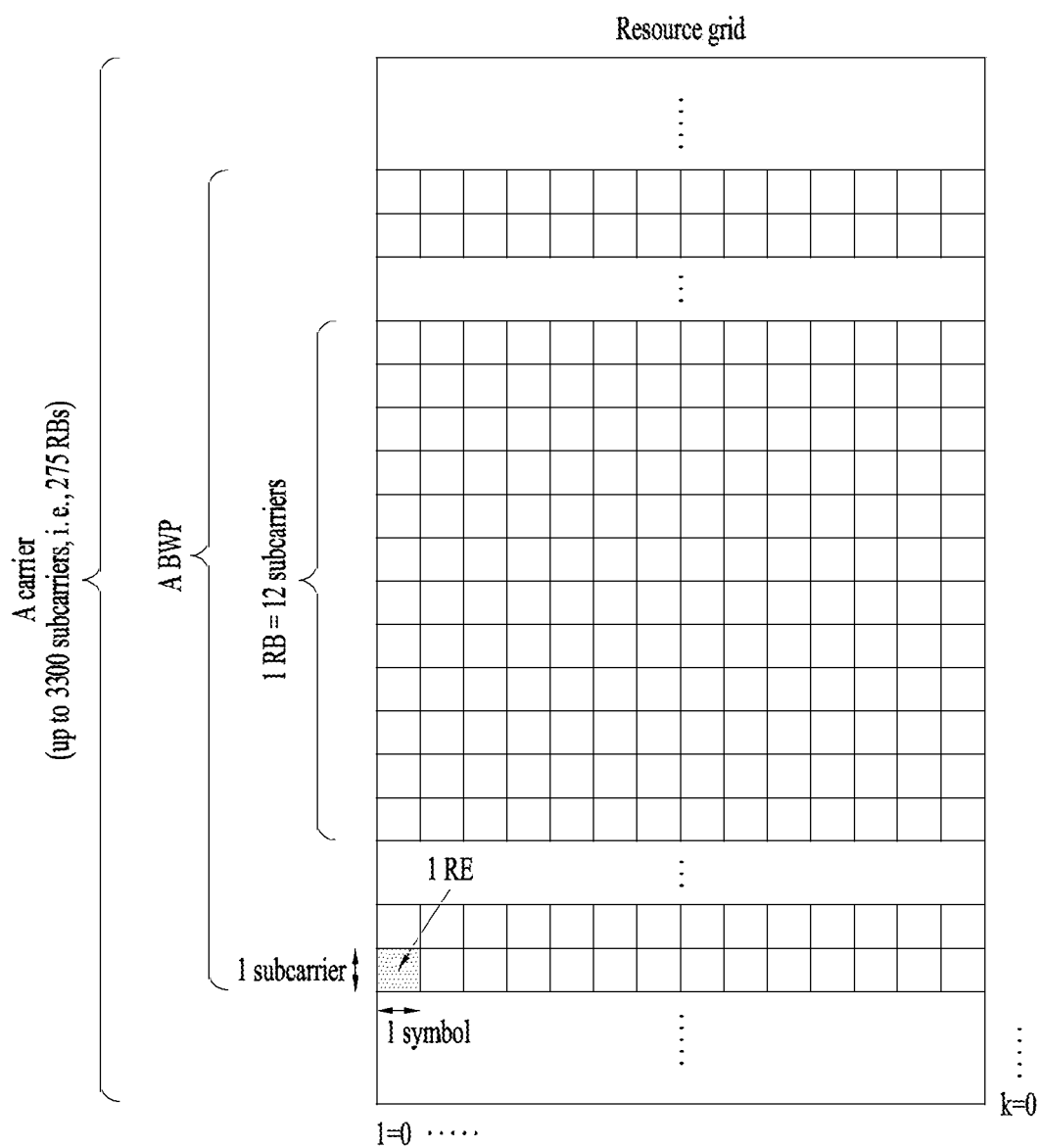
FIG. 3 is a diagram illustrating a slot structure in an NR system to which embodiments of the present disclosure are applicable.

FIG. 3 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
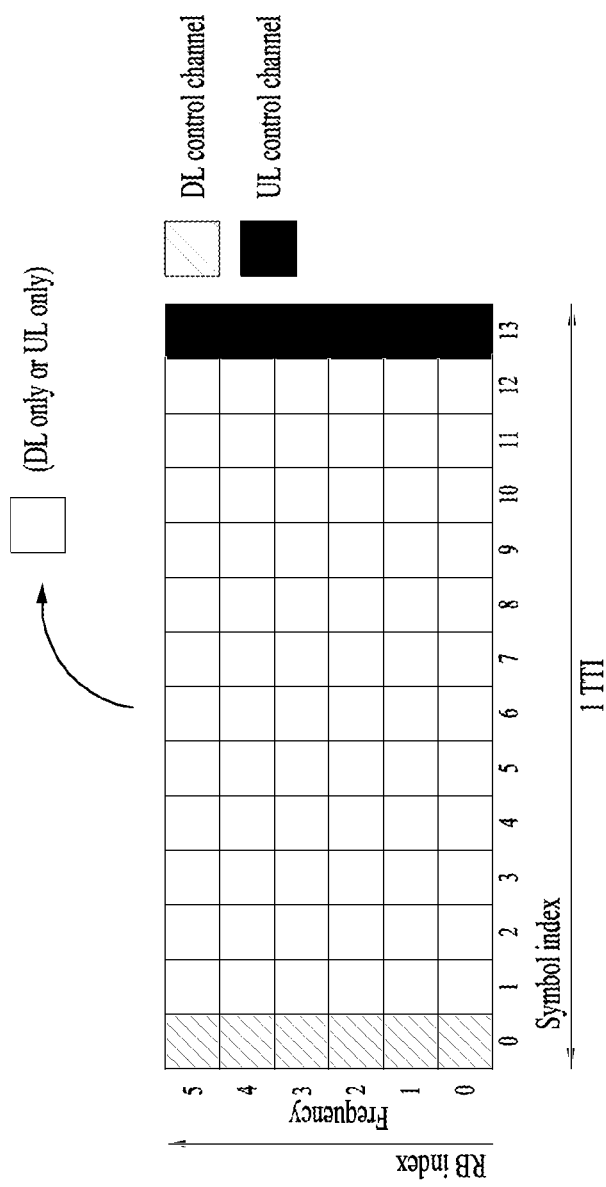
FIG. 4 is a diagram illustrating a self-contained slot structure in an NR system to which embodiments of the present disclosure are applicable.

FIG. 4 is a diagram illustrating a self-contained slot structures in an NR system to which embodiments of the present disclosure are applicable.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a base station and a UE may sequentially perform DL transmission and UL transmission in one slot. That is, the base station and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the base station and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 4.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

FIG. 5 is a diagram illustrating the structure of one REG in an NR system to which embodiments of the present disclosure are applicable.

In FIG. 5, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSC in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 3 lists exemplary PUCCH formats.

TABLE 3

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, [SR] | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the base station by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.3. DCI Format

In the NR system to which the present disclosure is applicable, the following DCI formats may be supported. First, the NR system may support DCI format 0_0 and DCI format 0_1 as a DCI format for PUSCH scheduling and support DCI format 1_0 and DCI format 1_1 as a DCI format for PDSCH scheduling. In addition, as DCI formats usable for other purposes, the NR system may additionally support DCI format 2_0, DCI format 2_1, DCI format 2_2, and DCI format 2_3.

Herein, DCI format 0_0 is used to schedule a transmission block (TB)-based (or TB-level) PUSCH. DCI format 0_1 may be used to schedule a TB-based (or TB-level) PUSCH or code block group (CBG)-based (or CBG-level) PUSCH (in the case in which CBG-based signal transmission and reception is configured).

In addition, DCI format 1_0 may be used to schedule TB-based (or TB-level) PDSCH. DCI format 1_1 may be used to schedule TB-based (or TB-level) PDSCH or CBG-based (or CBG-level) PDSCH (in the case in which CBG-based signal transmission and reception is configured).

In addition, DCI format 2_0 may be used to notify UEs of a slot format. DCI format 2_1 may be used to notify UEs of PRB(s) and OFDM symbol(s) in which a specific UE assumes that no transmission is intended therefor. DCI format 2_2 may be used to transmit transmission power control (TPC) commands for a PUCCH and a PUSCH. DCI format 2_3 may be used to transmit a group of TPC commands for SRS transmission by one or more UEs.

More specifically, DCI format 1_1 may include modulation and coding scheme (MCS)/new data indicator (NDI)/redundancy version (RV) fields for TB 1 and further include MCS/NDI/RV fields for TB 2 only when a higher layer parameter maxNrofCodeWordsScheduledByDCI in a higher layer parameter PDSCH-Config is set to n2 (i.e., 2).

In particular, when the higher layer parameter maxNrofCodeWordsScheduledByDCI is set to n2 (i.e., 2), whether a TB is substantially enabled/disabled may be determined by a combination of the MCS field and the RV field. More specifically, when the MCS field for a specific TB has a value of 26 and the RV field for the specific TB has a value of 1, the specific TB may be disabled.

Detailed features of the DCI formats may be supported by 3GPP TS 38.212. That is, obvious steps or parts which are not explained by DCI format-related features may be explained with reference to the above document. In addition, all terms disclosed in the present document may be explained by the above standard document.

1.4. Control Resource Set (CORESET)

One CORESET includes $N^{CORESET}_{RB}$ RBs in the frequency domain and $N^{CORESET}_{symb}$ symbols (having a value of 1, 2, or 3) in the time domain.

One control channel element (CCE) includes 6 resource element groups (REGs) and one REG is equal to one RB in one OFDM symbol. REGs in the CORESET are numbered in a time-first manner. Specifically, the REGs are numbered starting with '0' for the first OFDM symbol and the lowest-numbered RB in the CORESET.

A plurality of CORESETs may be configured for one UE. Each CORESET is related only to one CCE-to-REG mapping.

CCE-to-REG mapping for one CORESET may be interleaved or non-interleaved.

Configuration information for the CORESET may be configured by a higher layer parameter ControlResourceSet IE.

In addition, configuration information for CORESET 0 (e.g., common CORESET) may be configured by a higher layer parameter ControlResourceSetZero IE.

1.5. Antenna Port Quasi Co-Location

One UE may be configured with a list of up to M transmission configuration indicator (TCI) state configurations. The M TCI-state configurations may be configured by a higher layer parameter PDSCH-Config to decode a PDSCH (by the UE) according to a detected PDCCH with DCI intended for the UE and the given serving cell. Herein, M may be determined depending on the capability of the UE.

Each TCI state contains parameters for configuring a quasi co-location (QCL) relationship between one or two DL reference signals and the DMRS ports of the PDSCH. The QCL relationship is configured by the higher layer parameter qcl-Type1 for a first DL RS and a higher layer parameter qcl-Type2 for a second DL RS (if configured). For the case of two DL RSs, the QCL types should not be the same, regardless of whether the RSs are the same DL RS or different DL RSs. The QCL type corresponding to each DL RS is given by a higher layer parameter qcl-Type within a higher layer parameter QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives an activation command used to map up to 8 TCI states to codepoints of a TCI field in the DCI. When a HARQ-ACK signal corresponding to the PDSCH carrying the activation command is transmitted in slot #n, mapping between the TCI states and codepoints of the TCI field in the DCI may be applied starting from slot #(n+3*$N^{subframe,\mu}_{slot}$+1). In this case, $N^{subframe,\mu}_{slot}$ is determined based on Table 1 or Table 2 described above. After the UE receives initial higher layer configuration of TCI states and before the UE receives the activation command, the UE assumes that DM-RS port(s) of a PDSCH of a serving cell are quasi co-located with an SS/PBCH block determined in the initial access procedure with respect to 'QCL-TypeA'. Additionally, the UE may assume that the DM-RS port(s) of the PDSCH of the serving cell are quasi co-located with the SS/PBCH (synchronization signal/physical broadcast channel) block determined in the initial access procedure also with respect to 'QCL-TypeD' at the above timing.

If a higher layer parameter tci-PresentInDCI is set as 'enabled' for a CORESET scheduling the PDSCH, the UE assumes that the TCI field is present in a PDCCH of DCI format 1_1 transmitted on the CORESET. If the higher layer parameter tci-PresentInDCI is not configured for the CORESET scheduling the PDSCH or the PDSCH is scheduled by DCI format 1_0 and if a time offset between the reception of the DL DCI and the reception of the corresponding PDSCH is equal to or greater than a threshold Threshold-Sched-Offset (where the threshold is based on UE capability), for determining PDSCH antenna port QCL, the UE assumes that a TCI state or QCL assumption for the PDSCH is identical to a TCI state or QCL assumption applied to a CORESET used for PDCCH transmission.

If the higher layer parameter tci-PresentInDCI is set as 'enabled', the TCI field in the DCI scheduling a component carrier (CC) points to activated TCI states in the scheduled CC or a DL BW, and the PDSCH is scheduled by DCI format 1_1, the UE uses a TCI-state according to the TCI field in the DCI in a detected PDCCH to determine PDSCH antenna port QCL. The UE may assume that DMRS ports of the PDSCH of a serving cell are quasi co-located with RS(s) in the TCI state with respect to QCL type parameter(s) given by an indicated TCI state if the time offset between the reception of the DL DCI and the reception of the corresponding PDSCH is equal to or greater than the threshold Threshold-Sched-Offset (where the threshold is determined based on reported UE capability). When the UE is configured with a single slot PDSCH, the indicated TCI state should be based on the activated TCI states in a slot with the scheduled PDSCH. When the UE is configured with CORESET associated with a search space set for cross-carrier scheduling, the UE expects that the higher layer parameter tci-PresentInDci is set as 'enabled' for the CORESET. If one or more of the TCI states configured for the serving cell scheduled by the search space set contains 'QCL-TypeD', the UE expects the time offset between the reception of the detected PDCCH in the search space set and the reception of the corresponding PDSCH is greater than or equal to the threshold timeDurationForQCL.

For both the cases when higher layer parameter tci-PresentInDCI is set to 'enabled' and the higher layer parameter tci-PresentInDCI is not configured in RRC connected mode, if the offset between the reception of the DL DCI and the reception of the corresponding PDSCH is less than the threshold Threshold-Sched-Offset, the UE makes the following assumptions. (i) DM-RS ports of a PDSCH of a serving cell are quasi co-located with the RS(s) in a TCI state with respect to QCL parameter(s). (ii) In this case, the QCL parameter(s) are used for PDCCH QCL indication of the CORESET associated with a monitored search space with the lowest CORESET-ID in the latest slot in which one or more CORESETs within an active BWP of the serving cell are monitored by the UE.

In this case, if the 'QCL-TypeD' of a PDSCH DM-RS is different from 'QCL-TypeD' of a PDCCH DM-RS with which overlapping occurs in at least one symbol, the UE is expected to prioritize the reception of the ePDCCH associated with the corresponding CORESET. This operation may also be applied to an intra-band CA case (when the PDSCH and the CORESET are in different CCs). If none of configured TCI states contains 'QCL-TypeD', the UE obtains the other QCL assumptions from the indicated TCI states for a scheduled PDSCH irrespective of the time offset between the reception of the DL DCI and the reception of the corresponding PDSCH.

For a periodic CSI-RS resource in an NZP-CSI-RS-ResourceSet configured with a higher layer parameter trs-Info, the UE should assume that that a TCI state indicates one of the following QCL type(s):
'QCL-TypeC' with an SS/PBCH block and, when (QCL-TypeD) is applicable, 'QCL-TypeD' with the same SS/PBCH block, or
'QCL-TypeC' with an SS/PBCH block and, when (QCL-TypeD) is applicable, 'QCL-TypeD' with a periodic CSI-RS resource in a higher layer parameter NZPCSI-RS-ResourceSet configured with higher layer parameter repetition, For a CSI-RS resource in the higher layer parameter NZP-CSI-RS-ResourceSet configured with the higher layer parameter trs-Info and without the higher layer parameter repetition, the UE should assume that a TCI state indicates one of the following QCL type(s):
'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with the same CSI-RS resource, or
'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with an SS/PBCH, or
'QCL-TypeA' with a CSI-RS resource in the higher layer parameter NZP-CSI-RS-ResourceSet configured with the higher layer parameter trs-Info and, when (QCL-TyepD is) applicable, 'QCL-TypeD' with a periodic CSI-RS resource in the higher layer parameter NZP-CSI-RS-ResourceSet configured with the higher layer parameter repetition, or
'QCL-TypeB' with a CSI-RS resource in the higher layer parameter NZP-CSI-RS-ResourceSet configured with the higher layer parameter trs-Info when 'QCL-TypeD' is not applicable.

For a CSI-RS resource in the higher layer parameter NZP-CSI-RS-ResourceSet configured with the higher layer parameter repetition, the UE should assume that a TCI state indicates one of the following QCL type(s):
'QCL-TypeA' with a CSI-RS resource in the higher layer parameter NZP-CSI-RS-ResourceSet configured with the higher layer parameter trs-Info and, when ('QCL-TypeD') is applicable, 'QCL-TypeD' with the same CSI-RS resource, or
'QCL-TypeA' with a CSI-RS resource in the higher layer parameter NZP-CSI-RS-ResourceSet configured with the higher layer parameter trs-Info and, when ('QCL-TypeD' is) applicable, 'QCL-TypeD' with a CSI-RS resource in the higher layer parameter NZP-CSI-RS-ResourceSet configured with higher layer parameter repetition, or
'QCL-TypeC' with an SS/PBCH block and, when (QCL-TypeD) is applicable, 'QCL-TypeD' with the same SS/PBCH block.

For the DM-RS of PDCCH, the UE should assume that a TCI state indicates one of the following QCL type(s):
'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or
'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or
'QCL-TypeA' with a CSI-RS resource in the higher layer parameter NZP-CSI-RS-ResourceSet configured without higher layer parameter trs-Info and without the higher layer parameter repetition and, when (QCL-TypeD) is applicable, 'QCL-TypeD' with the same CSI-RS resource.

For the DM-RS of the PDSCH, the UE should assume that a TCI state indicates one of the following QCL type(s):
'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or
'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or
QCL-TypeA' with a CSI-RS resource in the higher layer parameter NZP-CSI-RS-ResourceSet configured without the higher layer parameter trs-Info and without the higher layer parameter repetition and, when (QCL-TypeD) is applicable, 'QCL-TypeD' with the same CSI-RS resource.

1.6. Channel State Information Reference Signal (CSI-RS)

In a mobile communication system according to the present disclosure, a method of improving transmit/receive data efficiency by adopting multiple transmit antennas and multiple receive antennas is used for packet transmission. In transmitting and receiving data using multiple input/output antennas, a channel state between a transmit antenna and a receive antenna should be detected in order to receive a signal accurately. Thus, each transmit antenna may have a separate reference signal. In this case, a reference signal for feedback of channel state information (CSI) may be defined as a CSI-RS.

The CSI-RS includes a Zero Power (ZP) CSI-RS and a Non-Zero-Power (NZP) CSI-RS. Here, the ZP CSI-RS and the NZP CSI-RS may be defined as follows.

The NZP CSI-RS may be configured by the CSI-RS-Resource Mobility field in the NZP-CSI-RS-Resource Information Element (IE) or CSI-RS-ResourceConfig-Mobility IE. The NZP CSI-RS may be defined based on a sequence generation and resource mapping method defined in the 3GPP TS 38.211 standard specification.

The ZP CSI-RS may be configured by the ZP-CSI-RS-Resource IE. The UE may assume that resources configured for the ZP CSI-RS are not used for PDSCH transmission. The UE performs the same measurement/reception on channels/signals except PDSCH regardless of whether they collide with ZP CSI-RS or not.

The position to which the CSI-RS is mapped in one slot may be dynamically determined by the number of CSI-RS ports, the CSI-RS density, Code Division Multiplexing (CDM)-Type, and higher layer parameters (e.g., firstOFDM-SymbolInTimeDomain, firstOFDMSymbolInTimeDomain2, etc.).

1.7. Channel State Information Interference Measurement (CSI-IM)

For interference measurement, the BS may configure CSI-IM support for the UE. The measurement result on the corresponding CSI-IM resource may be regarded as interference in the CSI calculation.

For the UE, one or more CSI-IM resource set configuration(s) indicated by the higher layer parameter CSI-IM-ResourceSet may be configured. Here, each CSI-IM resource set may be composed of K (K≥1) CSI-IM resource(s).

For each CSI-IM resource configuration, the following parameters may be configured through the higher layer parameter CSI-IM-ResourceSet:

- csi-IM-ResourceId: This parameter may determine the CSI-IM resource configuration ID.
- subcarrierLocation-p0 or subcarrierLocation-p1: This parameter may determine the subcarrier occupancy of the CSI-IM resource in a slot in which csi-IM-ResourceElementPattern is set as 'pattern0' or 'pattern1'.
- symbolLocation-p0 or symbolLocation-p1: This parameter may determine the OFDM symbol position of the CSI-IM resource in a slot in which csi-IM-ResourceElementPattern is set as 'pattern0' or 'pattern1'.
- periodicityAndOffset: This parameter may determine the CSI-IM periodicity and slot offset for a periodic/semi-persistent CSI-IM.
- freqBand: This parameter may include parameters for enabling the frequency occupancy configuration of CSI-IM.

1.8. Operation Example of Beam Management Procedure

In the present disclosure, the following DL L1/L2 beam management procedure may be supported within one or more Transmission and Reception Points (TRPs):

P1: P1 may be used in enabling UE measurement on different TRP Tx beams to support selection of TRP Tx beams and/or UE Rx beam(s).

>> For beamforming at a TRP, P1 may include intra/inter TRP Tx beam sweeping from a set of different beams.

>> For beamforming at a UE, P1 may include Rx beam sweeping of the UE from a set of different beams.

P2: P2 may be used in enabling measurement of a UE on different TRP Tx beams, to allow change of inter/intra TRP Tx beams.

>> P2 may be interpreted as a special case of P1. Thus, a set of beams for beam refinement may be configured to be smaller than P1.

P3: P3 may be used in enabling measurement of the UE on the same TRP Tx beam to allow change of the UE Rx beam when the UE uses beamforming.

In the present disclosure, the same procedure design may be applied for intra-TRP beam management and inter-TRP beam management. Accordingly, the UE may be designed to not know whether a beam is an intra-TRP beam or an inter-TRP beam.

The P2 and P3 procedures may be performed jointly and/or multiple times. Thereby, the TRP Tx beam and the UE Rx beam may be changed at the same time.

The P3 procedure may be performed without modifying the physical layer procedure defined in the existing standard specification (without specification impact). Alternatively, the P3 procedure may be performed through partial modification of the physical layer procedure defined in the existing standard specification.

The above-described methods may support management of a plurality of Tx/Rx beam pairs for a UE.

In addition, assistance information may be provided from another carrier for the methods described above.

The methods described above may be applied to all frequency bands in the same manner.

The methods described above may be used on a single beam/multiple beam per TRP.

In the present disclosure, the CSI-RS may support DL Tx beam sweeping and UE Rx beam sweeping. For example, the CSI-RS may be used for P1, P2, and P3 described above.

To this end, the CSI-RS may support the following mapping structure:

Np CSI-RS port(s) may be mapped in every (sub-)time unit

>> The same CSI-RS antenna port(s) may be mapped over (sub-)time units.

>> Np may be set to various values. For example, it may be set to a fixed value by a standard specification, or may be set to one of a plurality of values through configuration of a BS (e.g., RRC signaling, DCI, etc.).

>> In the present disclosure, a "time unit" may refer to a period of N OFDM symbols on the configured (or reference) numerology. N may be set to a value greater than or equal to 1. N may be set to a fixed value by a standard specification, or may be set to one of a plurality of values through configuration of the BS (e.g., RRC signaling, DCI, etc.). In this case, the OFDM symbols constituting one time unit may be configured consecutively or non-consecutively.

Each time unit may be divided into a plurality of sub-time units.

>> In the present disclosure, various division methods (e.g., Time Division Multiplexing (TDM), Interleaved Frequency Division Multiplexing (IFDM), etc.) may be applied. An OFDM symbol level may be divided into an OFDM symbol length that is the same as the reference OFDM symbol length or an OFDM symbol length that is shorter than the reference OFDM symbol length (e.g., a larger subcarrier spacing).

The mapping structure may be used to support multiple panels or multiple Tx panels.

Various options may be taken into consideration for a CSI-RS mapping method for Tx and Rx beam sweeping.

(1) Option 1

Tx beam(s) may be identically configured over sub-time units in each time unit.

Tx beam(s) may be configured differently over time units (2) Option 2

Tx beam(s) may be configured differently over sub-time units in each time unit.

Tx beam(s) may be identically configured over time units (3) Option 3

In one time unit, the Tx beam(s) may be identically configured over the sub-time units In other time units, the Tx beam(s) may be configured differently over the sub-time units A combination of different time units may be determined based on the number and the periodicity.

In the options described above, an operation of performing only Tx sweeping or Rx sweeping may also be applied.

For the above-described P3 procedure, the followings may be additionally considered.

When the sub-time unit is less than or equal to one OFDM symbol length, the Tx beam(s) may be configured identically or differently over the sub-time units in each time unit.

As an example, one OFDM symbol period may be divided into a plurality of sub-time units for a P3 operation. Accordingly, UE Rx beam sweeping for the same TRP Tx beam may be allowed.

In addition, a P3 operation based on IFDMA or (relatively) large subcarrier spacing may also be considered.

When a P3 operation based on IFDMA is considered, the followings may be considered.

How many comb values should be supported;

Whether to support a comb offset;

Whether the UE is capable of clearly distinguishing between the NZP CSI-RS REs and the ZP (Null) REs within the same OFDM symbol (to utilize Rx beam sweeping for P3)

For the last issue among the issues above, Multiple CSI-RS resources including (i) one resource configured based on NZP and a specific comb value/offset, and (ii) other resources configured based on an independent comb value/offset (to appropriately indicate null REs). In this case, whether CSI-RS resource multiplexing is appropriately supported for multiple UEs in the frequency domain may be further checked based on the appropriate null RE configuration and the independent comb value/offset configuration.

In summary, when IFDMA is considered, an appropriate null RE configuration may be considered in order to support CSI-RS resource multiplexing for multiple UEs in the frequency domain.

On the other hand, the P3 operation may be supported by (i) configuring a single CSI-RS resource including a plurality of OFDM symbols, or (ii) repeating the same CSI-RS resource over a plurality of OFDM symbols. According to this approach, a simpler UE implementation may be supported by maintaining the beam sweeping interval so as to be an integer multiple of a symbol length.

In the present disclosure, a higher layer parameter NZP-CSI-RS-ResourceSet may be configured for the UE for a repetitive operation for the P3 operation. The higher layer parameter may be defined based on 3GPP TS 38.331 as follows.

| NZP-CSI-RS-ResourceSet information element |
|---|
| -- ASN1START<br>-- TAG-NZP-CSI-RS-RESOURCESET-START<br>NZP-CSI-RS-ResourceSet ::=    SEQUENCE {<br>  nzp-CSI-ResourceSetID          NZP-CSI-RS-ResourceSetID,<br>  nzp-CSI-RS-Resources              SEQUENCE (SIZE (1 maxNrofNZP-CSI-RS-ResourcesPerSet)) OF NZP-CSI-RS-ResourceID.<br>  repetition                     ENUMERATED { on. off }                          OPTIONAL, -- Need S<br>  aperiodicTriggeringOffset      INTEGER(0..6)                                   OPTIONAL, -- Need S<br>  us-Info                        ENUMERATED {true}                               OPTIONAL. -- Need R<br>  ...<br>}<br>-- TAG-NZP-CSI-RS-RESOURCESET-STOP<br>-- ASN1STOP |

In this case, the parameter repetition in the NZP-CSI-RS-ResourceSet IE may be defined as follows.

repetition in NZP-CSI-RS-ResourceSet is associated with a CSI-RS resource set and defines whether UE can assume the CSI-RS resources within the NZP CSI-RS Resource Set are transmitted with the same downlink spatial domain transmission filter or not as described in Subclause 5.1.6.1.2. and can be configured only when the higher layer parameter reportQuantity associated with all the reporting settings linked with the CSI-RS resource set is set to 'cri-RSRP' or 'none'.

1.9. CSI Reporting-Related Configurations

For CSI reporting applicable to the present disclosure, the following parameters may be configured for the UE.

(1) CSI-ReportConfig

The higher layer parameter may be defined based on 3GPP TS 38.331 as follows.

| CSI-ReportConfig information element |
|---|
| ``` 
-- ASN1START
-- TAG-CSI-REPORTCONFIG-START
CSI-ReportConfig ::=                    SEQUENCE {
    reportConfigId                          CSI-ReportConfigId,
    carrier                                 ServCellIndex                     OPTIONAL, -- Need S
    resourcesForChannelMeasurement          CSI-ResourceConfigId,
    csi-IM-ResourcesForInterference         CSI-ResourceConfigId              OPTIONAL, -- Need R
    nzp-CSI-RS-ResourcesForInterference     CSI-ResourceConfigId              OPTIONAL, --- Need R
    reportConfigType                        CHOICE {
        periodic                                SEQUENCE {
            reportSlotConfig                        CSI-ReportPeriodicityAndOffset,
            pucch-CSI-ResourceList                      SEQUENCE (SIZE (1..maxNrof-BWPs)) OF PUCCH-CSI-Resource
        },
        semiPersistentOnPUCCH                   SEQUENCE {
            reportSlotConfig                        CSI-ReportPeriodicityAndOffset,
            pucch-CSI-ResourceList                      SEQUENCE (SIZE (1..maxNrofBWPs)) OF PUCCH-CSI-Resource
        },
        semiPersistentOnPUSCH                   SEQUENCE {
            reportSlotConfig                        ENUMERATED {sl5, sl10, sl20, sl40, sl80, sl160, sl320},
            reportSlotOffsetList                    SEQUENCE (SIZE (1..maxNrofUL-Allocations)) OF INTEGER(0..32),
            p0alpha                                 P0-PUSCH-AlphaSetId
        },
        aperiodic                               SEQUENCE {
            reportSlotOffsetList                    SEQUENCE (SIZE (1..maxNrofUL-Allocations)) OF INTEGER(0..32)
        }
    },
    reportQuantity                          CHOICE{
        none                                    NULL,
        cri-RI-PMI-CQI                          NULL,
        cri-RI-i1                               NULL,
        cri-RI-i1-CQI                       SEQUENCE {
            pdsch-BundleSizeForCSI                  ENUMERATED {n2, n4}                        OPTIONAL -- Need S
        },
        cri-RI-CQI                          NULL,
        cri-RSRP                            NULL,
        ssb-Index-RSRP                      NULL,
        cri-RI-LI-PMI-CQI                   NULL
    },
    ...
    groupBasedBeamRepotimg                  CHOICE {
        enabled                                 NULL,
        disabled                            SEQUENCE {
            nrofReportedRS                          ENUMERATED {n1, n2, n3, n4}                OPTIONAL -- Need S
        }
    }
}.
``` |

Here, resourceForChannelMeasurement, csi-IM-ResourceForInterference, and nzp-CSI-RS-ResourceForInterference in the CSI-ReportConfig IE may have the following relationship.

For aperiodic CSI, each trigger state configured using the higher layer parameter CSI-AperiodicTriggerState is associated with one or multiple CSI-ReportConfig where each CSI-ReportConfig is linked to periodic, or semi-persistent, or aperiodic resource setting(s):

When one Resource Setting is configured, the Resource Setting (given by higher layer parameter resourcesForChannelMeasturement) is for channel measurement for L1-RSRP computation.

When two Resource Settings are configured, the first one Resource Setting (given by higher layer parameter resourcesForChannelMeasurement) is for channel measurement and the second one (given by either higher layer parameter csi-IM-ResourcesForInterference or higher layer parameter nzp-CSI-RS-ResourcesForInterference) is for interference measurement performed on CSI-IM or on NZP CSI-RS.

When three Resource Settings are configured, the first Resource Setting (higher layer parameter resources-ForChannelMeasurement) is for channel measurement, the second one (given by higher layer parameter csi-IM-ResourcesForInterference) is for CSI-IM based interference measurement and the third one (given by higher layer parameter nzp-CSI-RS-ResourcesForInterference) is for NZP CSI-RS based interference measurement.

For semi-persistent or periodic CSI, each CSI-ReportConfig is linked to periodic or semi-persistent Resource Setting(s):

When one Resource Setting (given by higher layer parameter resourcesForChannelMeasurement) is configured, the Resource Setting is for channel measurement for L1-RSRP computation.

When two Resource Settings are configured, the first Resource Setting (given by higher layer parameter resourcesForChannelMeasurement) is for channel measurement and the second Resource Setting (given by higher layer parameter csi-IM-ResourcesForInterference) is used for interference measurement performed on CSI-IM.

A UE is not expected to be configured with more than one CSI-RS resource in resource set for channel measurement for a CSI-ReportConfig with the higher layer parameter codebookType set to 'typeII' or to 'typeII-PortSelection'. A UE is not expected to be configured with more than 64 NZP CSI-RS resources in resource setting for channel measurement for a CSI-ReportConfig with the higher layer parameter reportQuantity set to 'none'. 'cri-RI-CQI'. 'cri-RSRP' or 'ssb-Index-RSRP'. If interference measurement is performed on CSI-LM, each CSI-RS resource for channel measurement is resource-wise associated with a CSI-IM resource by the ordering of the CSI-RS resource and CSI-IM resource in the corresponding resource sets. The number of CSI-RS resources for channel measurement equals to the number of CSI-IM resources.

If interference measurement is performed on NZP CSI-RS, a UE does not expect to be configured with more than one NZP CSI-RS resource m the associated resource set within the resource setting for channel measurement. The UE configured with the higher layer parameter nzp-CSI-RS-ResourcesForInterference may expect no more than 18 NZP CSI-RS ports configured in a NZP CSI-RS resource set.

For CSI measurement(s), a UE assumes:
  each NZP CSI-RS port configured for interference measurement corresponds to an interference transmission layer
  all interference transmission layers on NZP CSI-RS ports for interference measurement take into account the associated EPRE ratios configured in 5.2.2.3.1;
  other interference signal on REs of NZP CSI-RS resource for channel measurement, NZP CSI-RS resource for interference measurement, or CSI-LM resource for interference measurement.

Based on the relationship above, CSI calculation may be performed as follows.

If the UE is configured with a CSI-ReportConfig with the higher layer parameter reportQuantity set to 'cri-RSRP', 'cri-RI-PMI-CQI'. 'cri-RI-i1'. 'cri-RI-i1-CQI'. 'cri-RI-CQI' or 'cri-RI-LI-PMI-CQI', and $K_s$, >1 resources are configured in the corresponding resource set for channel measurement, then the UE shall derive the CSI parameters other than CRI conditioned on the reported CRI, where CRI k (k≥0) corresponds to the configured (k+1)-th entry of associated nzp-CSI-RSResource in the corresponding nzp-CSI-RS-ResourceSet for channel measurement, and (k+1)-th entry of associated csi-IM-Resource in the corresponding csi-IM-ResourceSet (if configured) If $K_s$, =2 CSI-RS resources are configured, each resource shall contain at most 16 CSI-RS ports. If 2<$K_s$≤8 CSI-RS resources are configured, each resource shall contain at most 8 CSI-RS ports.

A report on reportQuantity={cri-RSRP or ssb-Index-RSRP} may be distinguished based on whether the parameter groupBasedBeamReporting in the CSI-ReportConfig IE is 'enabled' or 'disabled' as follows.

If the UE is configured with a CSI-ReportConfig with the higher layer parameter reportQuantity set to 'cri-RSRP' or 'ssb-Index-RSRP'.
  if the UE is configured with the higher layer parameter groupBasedBeamReporting set to 'disabled', the UE is not required to update measurements for more than 64 CSI-RS and/or SSB resources, and the UE shall report in a single report nrofReportedRS (higher layer configured) different CRI or SSBRI for each report setting.
  if the UE is configured with the higher layer parameter groupBasedBeamReporting set to 'enabled', the UE is not required to update measurements for more than 64 CSI-RS and/or SSB resources, and the UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters.

If the UE is configured with a CSI-ReportConfig with higher layer parameter reportQuantity set to 'cri-RSRP' or 'none' and the CSI-ReportConfig is linked to a resource setting configured with the higher layer parameter resourceType set to 'aperiodic', then the UE is not expected to be configured with more than 16 CSI-RS resources in a CSI-RS resource set contained within the resource setting.

For L1-RSRP computation, the UE may be configured as follows. In this case, the UE may perform the following reporting based on nrofReportedRS or groupBasedBeamReporting.

For L1-RSRP computation
  the UE may be configured with CSI-RS resources. SS/PBCH Block resources or both CSI-RS and SS/PBCH block resources, when resource-wise quasi co-located with 'QCL-Type C' and 'QCL-TypeD' when applicable.
  the UE may be configured with CSI-RS resource setting up to 16 CSI-RS resource sets having up to 64 resources within each set. The total number of different CSI-RS resources over all resource sets is no more than 128.

For L1-RSRP reporting, if the higher layer parameter nrofReportedRS in CSI-ReportConfig is configured to be one, the reported L1-RSRP value is defined by a 7-bit value in the range [−140, −44] dBm with 1 dB step size, if the higher layer parameter nrofReportedRS is configured to be larger than one, or if the higher layer parameter groupBasedBeamReporting is configured as 'enabled', the UE shall use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The mapping between the reported L1-RSRP value and the measured quantity is described in [11, TS 0.38.133].

2. Examples of Operations of UE and BS Proposed in the Present Disclosure

Before describing the present disclosure, terms used to describe the present disclosure are defined as follows.

In the present disclosure, for simplicity, a method for a signal to interference and noise ratio (L1-SINR) measurement using a ZP CSI-RS (or CSI-IM) will be mainly described based on a sub-time interval of 1 OFDM symbol or less. However, all configurations proposed in the present disclosure are not limited to the SINR measurement operation, and may be extended to or replaced with a reference signal received quality (RSRQ) according to an embodiment.

In addition, in the present disclosure, the term "NZP CSI-RS resource" may be replaced with "NZP CSI-RS."

In addition, in the present disclosure, a resource configured for/allocated to a UE for the purpose of channel measurement is referred to as a channel measurement resource (CMR), and a resource configured for/allocated to a UE for the purpose of interference measurement is referred to as an interference measurement resource (IMR). Here, IMR may be replaced with the term "CSI-IM." Alternatively, the IMR may include a zero power (ZP) IMR on which transmission of a specific reference signal (RS) is substantially skipped and a non-zero power (NZP) IMR on which the specific RS is transmitted. Here, according to an embodiment, the term "ZP IMR" may be extended to/replaced with "ZP CSI-RS." In this case, the ZP CSI-RS may be an RS that is configured/designated not only for interference measurement, but also for PDSCH rate matching.

Thus, in the present disclosure, measuring interference based on "ZP CSI-RS" may have the same meaning as measuring interference using "ZP IMR."

Hereinafter, based on the description above, resources on which a UE measures interference are collectively referred to as an IMR.

In the conventional NR Rel-15 system, RSRP reporting may be allowed for the UE for beam management. Here, the RSRP may be simply an indicator indicating only the received signal power, without considering the interference strength. Therefore, when a BS Tx beam and/or a UE Rx beam are selected, considering only the RSRP, a BS Tx beam and/or a UE Rx beam with strong interference may be selected even if the RSRP is high.

In order to address such an issue, the present disclosure proposes that SINR report considering interference be considered for beam management. More specifically, in the present disclosure, a method for measurement of an interference signal power needed for the UE to perform SINR calculation will be described in detail based on the conventionally defined CSI-ReportConfig and IMR (e.g., ZP CSI-RS, CSI-IM, etc.).

In the conventional NR Rel-15 system, the BS may configure an NZP CSI-RS resource set with one more resources and repetition='on' for the UE to allow the UE to perform the P3 operation. In this case, the UE may find an optimum Rx beam by sweeping a UE Rx beam in one OFDM symbol unit (e.g., sub-time unit=1).

The BS may generate a reference signal repeating N times within one OFDM symbol period (e.g., a reference signal having the same signal waveform that repeats N times within one OFDM symbol period) in the time domain, based on the IFDMA scheme or a larger subcarrier spacing. In this case, the UE may find the optimum Rx beam by sweeping the UE Rx beam N times in one OFDM symbol period (wherein sub-time unit=1/N may be configured). Accordingly, RS overhead may be reduced to 1/N, and the latency time according to the RS may also be reduced.

In the following description, repeatedly transmitting a specific signal N times within a predetermined time period in the time domain may include repeatedly transmitting the same signal (or the same signal waveform) N times in the predetermined time period from the perspective of the reception node (e.g., the UE). Accordingly, the reception node may perform Rx beam sweeping up to N times based on (or on the assumption) that the same signal (or the same signal waveform) is repeated N times within the predetermined time period.

In view of the above, in the present disclosure, a method of defining a reference signal repeating in the time domain based on CSI-ReportConfig and IMR (e.g., ZP CSI-RS, CSI-IM, etc.), and a specific operation example of the UE based thereon will be described in detail.

Figure 6:
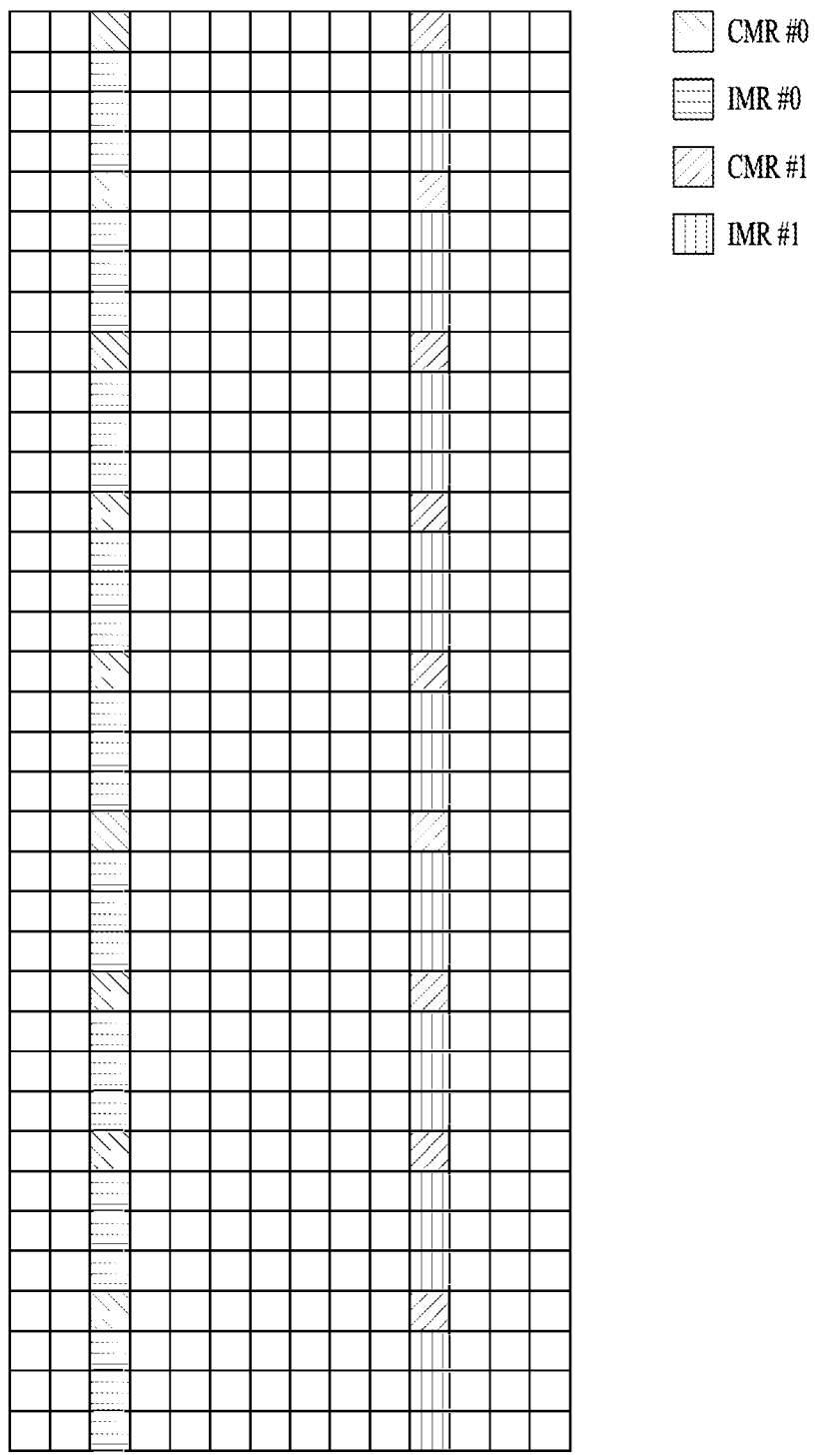
FIGS. 6 to 8 are reference diagrams illustrating operation examples of a UE proposed in the present disclosure.
Figure 7:
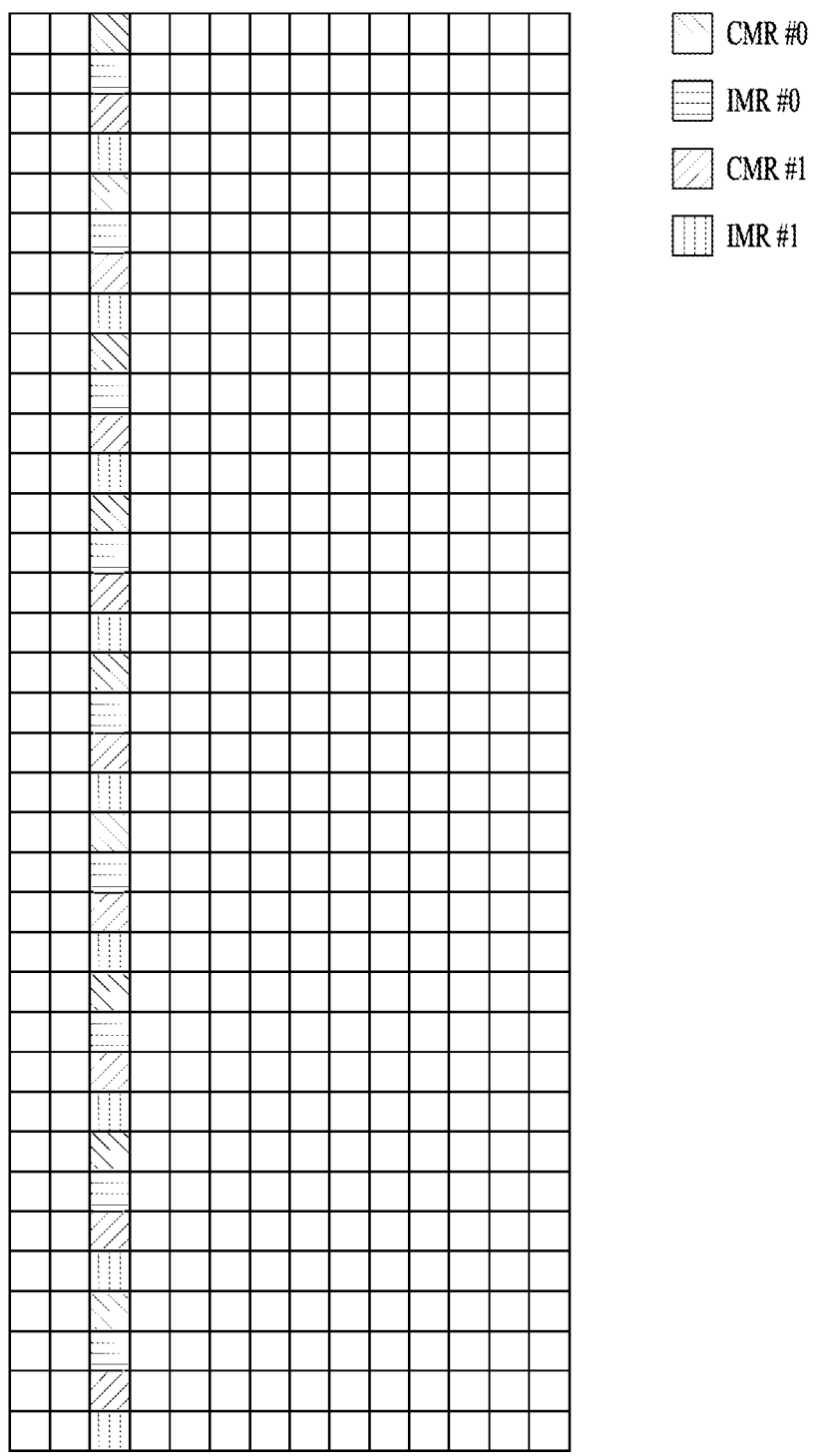
Figure 8:
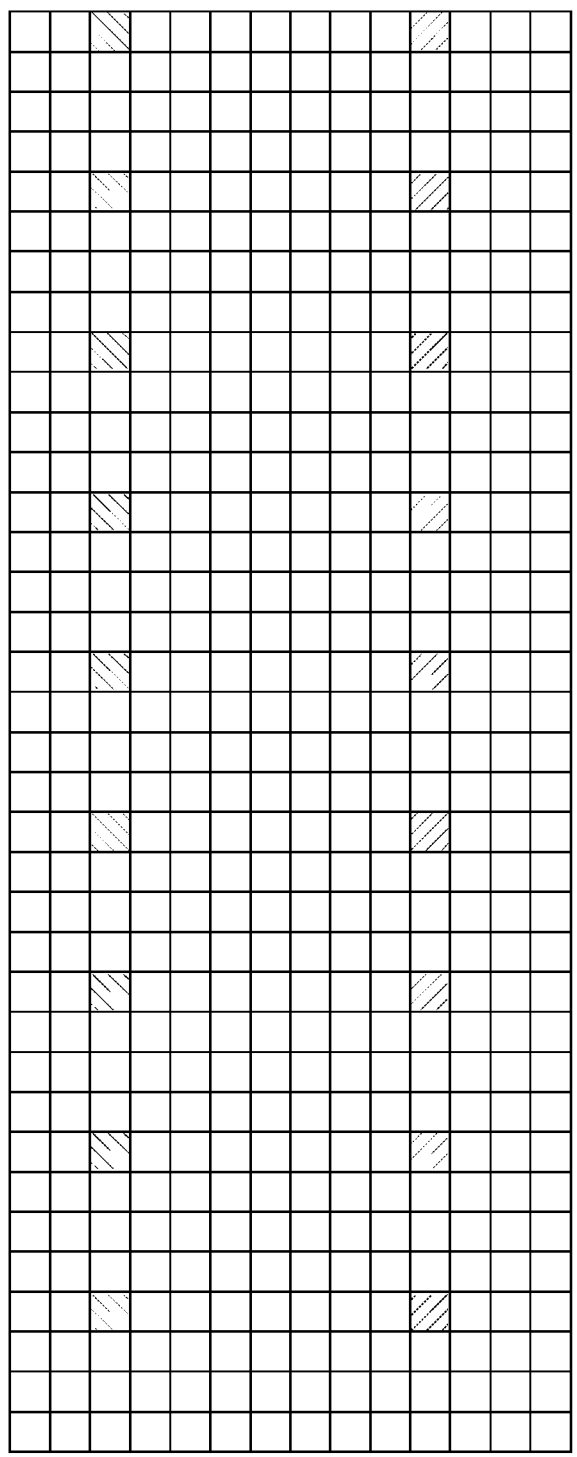

FIGS. 6 to 8 are reference diagrams illustrating operation examples of a UE proposed in the present disclosure. Hereinafter, operation examples of a UE and a BS proposed in the present disclosure will be described in detail with reference to the drawings.

2.1. First Operation Example

According to a first operation example proposed in present disclosure, an IMR having a single port CMR (e.g., NZP CSI-RS resource) and an (N−1, 1) RE pattern (e.g., ZP CSI-RS, CSI)-IM, etc.) may be configured to be subjected to frequency division multiplexing (FDM) on the same OFDM symbol (in an interleaved manner). Here, the (A, B) RE pattern may refer to an RE pattern determined based on A consecutive subcarriers in the frequency domain and B consecutive symbols in the time domain.

Thus, the CMR (e.g., NZP CSI-RS) may be configured such that the same signal (or the same signal waveform) in the time domain is repeated N times on one OFDM symbol (e.g., sub-time-unit=1/N).

As an example, as shown in FIG. 6, a CMR (e.g., NZP CSI-RS resource) #0 related to a single antenna port and an IMR (e.g., ZP CSI-RS, CSI-IM, etc.) having a (3, 1) RE pattern may be subjected to frequency domain multiplexing (FDM) on the same OFDM symbol in an interleaved manner. In this case, the CMR (e.g., NZP CSI-RS resource) may be configured such that the same signal (or the same signal waveform) in the time domain is repeated 4 times on one OFDM symbol.

2.2. Second Operation Example

According to the second operation example proposed in the present disclosure, when at least one of the following conditions is satisfied and "Report (L1) RSRP" or "Report nothing" is configured for the UE (e.g., ReportQuantity)='cri-RSRP' or 'none'), the UE may assume that the received RS (e.g., CSI-RS) is configured to be repeated N times on one OFDM symbol in the time domain. In other words, when the conditions are satisfied, the UE may assume that the received RS (or the waveform of the received RS) is configured to be repeated N times on one OFDM symbol. The "following conditions" considered for the above-described operation in the time domain may include the following conditions.

Condition #1: The number of ports of a CMR (e.g., NZP CSI-RS resource) is 1;

Condition #2: The IMR (e.g. ZP CSI-RS, CSI-IM, etc.) RE pattern is (1, 1) or (3, 1) or (7, 1); and Condition #3: In terms of resources, a specific CMR (e.g., NZP CSI-RS resource) in the (resource-wise) NZP CSI-RS resource set and an IMR corresponding to the specific CMR in the set of IMRs (e.g. ZP CSI-RS, CSI-IM, etc.) are subjected to FDM (in an interleaved manner) on the same OFDM symbol in the frequency domain, based on the resources included in the set of CMRs (e.g. NZP CSI-RS resource) for channel measurement (e.g., resourceForChannelMeasurement) and the set of IMRs (e.g., ZP CSI-RS, CSI-IM, etc.) for interference measurement (e.g., csi-IM-ResourceForInterference or ZP-CSI-RS-ResourceSet, etc.).

In this case, the UE may perform UE Rx beam sweeping up to N times within one OFDM symbol period based on the RS, thereby finding an optimum UE Rx beam (e.g., P3 operation).

As a specific example, it is assumed that the following two resource sets are configured for the UE: resourceForChannelMeasurement={NZP CSI-RS resource #0, NZP CSI-RS resource #1}, csi-IM-ReousrceForInterference={ZP CSI-RS resource #0, ZP CSI-RS resource #1}. It is also assumed that the number of antenna ports for CMR (e.g., NZP CSI-RS resource) is set to 1, and the RE pattern for IMR (e.g., ZP CSI-RS, CSI-IM, etc.) is configured as a (3, 1) RE pattern.

Referring to FIG. 6, for each of a CMR (e.g., NZP CSI-RS resource) set and an IMR (e.g., ZP CSI-RS resource, CSI- IM, etc.) set configured for the UE, resource-wise corresponding resources are configured to be subjected to FDM in an interleaved manner on the same OFDM symbol in the frequency domain. That is, according to FIG. 6, Conditions #1, #2, and #3 described above may all be satisfied.

In this case, when ReportQuantity='cri-RSRP' or 'none' is configured for the UE, the UE may assume that a received RS (e.g., CSI-RS) is transmitted in a manner that the same signal (or the same signal waveform) is repeated 4 times on one OFDM symbol in the time domain. Thus, the UE may find an optimum Rx beam based on up to four Rx beams for each resource, thereby selecting an optimum BS Tx beam (e.g., NZP CSI-RS resource) and UE Rx beam more accurately.

According to the method defined in the conventional NR Rel-15 standard, the UE measures RSRP for each resource on the assumption of one Rx beam, and accordingly may select an optimum BS Tx less accurately than in the method proposed in the present disclosure. That is, according to the present disclosure, a method of selecting an optimum BS Tx beam and UE Rx beam more accurately than the method defined in the conventional standard may be proposed.

In the second operation example, even when the same RS (or waveform of the RS) is repeatedly transmitted 4 times on one OFDM symbol, the UE may select an optimum BS Tx beam using one Rx beam. In this case, the UE loses an Rx beam sweeping opportunity (i.e., an opportunity for selection of an optimum UE Rx beam), but may be advantageous in terms of received power as the four repeated signals are received with one Rx beam and then accumulated. As a result, the operation may be useful when the path-loss is large.

Alternatively, In the above case, the UE may select an optimum BS Tx beam using two Rx beams. In this case, the UE may accumulate two repeatedly transmitted signals based on one Rx beam, and may perform Rx beam sweeping twice.

As described above, whether the UE is to (i) use the received repeated signals for Rx beam sweeping or (ii) receive and accumulate the repeatedly transmitted signals based on a specific fixed Rx beam may depend on the implementation issue of the UE.

As another example, as shown in FIG. 7, an IMR (e.g., ZP CSI-RS resource, CSI-IM, etc.) RE pattern may be configured as a (1, 1) RE pattern, and two CMRs may be configured to be subjected to FDM in an interleaved manner on one OFDM symbol. In this case, the UE may assume that the two CMRs are different BS Tx beams (e.g., the UE may assume that the Tx filters (or Tx coefficients) used on the two CMRs are different or not the same). In this case, the UE may measure a total of eight beam pairs (e.g., two BS Tx beams and four UE Rx beams) on one OFDM symbol.

As a result, according to FIG. 7, RS overhead required for selection of the optimum BS Tx beam and UE Rx (e.g., P1 operation) may be reduced by half compared to the case of FIG. 6. The latency for the operation may also be reduced.

2.2.1. First Additional Operation Example for the Second Operation Example

In the second operation example this way above, the UE may determine the number of repetitions N based on the configured IMR RE pattern.

For example, when the RE patterns are (1, 1), (3, 1), and (7, 1), N may be determined as/set to 2, 4, or 8, respectively. In this case, when the IMR RE patterns are configured as (1, 1) and (3, 1), CMR and IMR may be transmitted on a resource block (RB)-by-RB basis. Alternatively, when the IMR RE pattern is configured as (7, 1), CMR and IMR may be transmitted in units of two RBs.

In Condition #1 for the second operation example described above, a case where the IMR RE pattern is (1, 1) or (3, 1) or (7, 1) is considered. This is because, when such an RE pattern is used, an RS (e.g., CSI-RS) may be repeatedly transmitted exactly 2, 4, and 8 times in the time domain. More specifically, it is assumed that the size of the Inverse Fourier Transform (IFFT) and/or Fast Fourier Transform (FFT) is $2^q$ (where q is an integer), and the above-mentioned characteristics may be given only when the frequency RE interval configured with CMR is $2^n$ REs (where n is an integer). This may be because the IMR RE pattern may be configured as (1, 1), (3, 1), or (7, 1).

When it is assumed that the (2, 1) or (4, 1) RE pattern is used as an IMR RE pattern, the RS may be repeatedly transmitted three or five times on one OFDM symbol in the time domain. However, since the signals on the repetitive transmissions are not exactly the same (assuming the existing IFFT and/or FFT size), the performance may be reduced in the P3 operation.

Thus, when a divisor of the IFFT and/or FFT size is set to 3 or 5 (e.g., the IFFT and/or FFT size is divided by 3 or 5), the repeatedly transmitted signals (or signal waveforms) may be exactly identically configured even when the (2, 1) or (4, 1) RE pattern is used as the IMR RE pattern.

Therefore, Condition #1 considered in the second operation example according to the present disclosure may not be limited to the case where the RE pattern is (1, 1), (3, 1), or (7, 1), and additional RE patterns may be considered in some cases (e.g., when the divisor of the IFFT and/or FFT size is set to 3 or 5).

2.2.2. Second Additional Operation Example for the Second Operation Example

When transmission is performed in a manner that one CMR is repeated N times on one OFDM symbol in the time domain, whether the UE can find an optimum UE Rx beam based on the CMR using N Rx beams may be defined by UE capability. When the UE sends a report to the BS to inform that the UE does not support the operation, the UE may not expect that a sub-time unit may be configured to be shorter than 1 OFDM symbol length for the P3 operation. In other words, when the UE sends a report to the BS to inform that the UE does not support the operation, the UE may expect that the sub-time unit is set to 1 OFDM symbol length for the P3 operation.

According to the second operation example described above, the UE may find an optimum Rx beam based on up to N Rx beams for each resource. However, in consideration of the above-described implementation issue of the UE, the UE may not always perform the above-described operation.

Accordingly, whether the UE supports the operation may be defined by the UE capability, and the UE may report the UE capability to the BS. In the case where the UE sends a report to the BS that the operation cannot be performed, the BS may configure NZP CSI-RS resource set with one more CSI-RS resources and repetition='on' for the P3 operation for the UE. (In this case, the sub-time unit may be set to 1 OFDM symbol length).

2.2.3. Third Additional Operation Example for the Second Operation Example

In the second operation example described above, the BS may additionally indicate, to the UE through a separate parameter, that an RS (e.g., NZP CSI-RS resource) is repeatedly transmitted N times on one OFDM symbol in the time domain. Here, the parameter may be configured for the UE through an higher layer parameter (e.g., a media access control-control element (MAC-CE), radio resource control (RRC), etc.). Accordingly, when the UE receives the configuration of the parameter from the BS, the UE may assume that the received RS (e.g., NZP CSI-RS resource) is repeatedly transmitted N times on one OFDM symbol in the time domain.

More specifically, considering Condition #3 of the second operation example described above, it should be checked whether the resources included in two resource sets (e.g., the CMR set and the IMR set) configured for the UE are subjected to FDM in an interleaved manner on the same OFDM symbol resource-wise in the frequency domain. Such checking operation may increase the operation complexity of the UE.

In this additional operation example, in order to address the above-described issue, it is proposed that the BS configure for the UE a separate parameter indicating that an RS is repeatedly transmitted N times.

Here, the separate parameter may be configured in various ways. For example, it may be defined as a new IE not defined in the conventional 3GPP NR specification, or as a new higher layer parameter in the CSI-ReportConfig IE defined in the conventional 3GPP NR specification.

The BS may configure the parameter for the UE through the RRC, and/or MAC-CE, and/or DCI.

When the parameter is configured for the UE, the UE may expect that the resources included in two resource sets (e.g., CMR set and IMR set, etc.) configured for the UE will be subjected to FDM in an interleaved manner on the same OFDM symbol resource-wise in the frequency domain. In other words, when the parameter is configured for the UE, the UE may assume that the configured CMR is repeatedly transmitted N times on one OFDM symbol.

As a specific example, the parameter proposed in the third additional operation example may be defined as subTimeUnitlessthan1 in the CSI-ReportConfig IE as follows. However, this name of the parameter is merely one example proposed in the present disclosure, and the parameter may have another name according to an example. Additionally, in consideration of SINR report, reportQuantity may additionally include cri-SINR.

TABLE 4

CSI-ReportConfig {
ReportConfigID
Carrier
resourceForChannelMeasurement
csi-IM-ResourceForInterference
subTimeUnitlessthan1
reportConfigType
  Periodic
  SP
  Aperiodic
reportQuantity
  none
  cri-RSRP
  cri-SINR
}

2.3. Third Operation Example

When the conditions according to the above-described second operation example (e.g., Conditions #1, #2, #3) are satisfied and L1-SINR report is configured for the UE (e.g., ReportQuantity='cri-SINR'), the UE may assume that an RS (e.g., NZP CSI-RS resource) transmitted from the BS is repeatedly transmitted once on one OFDM symbol in the time domain.

In order for the UE to calculate the SINR, accurate measurement of interference signal power is required. When an IMR (e.g., ZP CSI-RS, CSI-IM, etc.) on which a desired signal is not transmitted is used for SINR calculation, the UE may more accurately measure the interference signal power. To this end, the UE should assume that an RS (e.g., CSI-RS) transmitted from the BS (the same signal) is repeatedly transmitted once on one OFDM symbol in the time domain. Accordingly, the UE may measure the interference signal power on the RE configured as an IMR by applying FFT (or Discrete Fourier Transform (DFT)) to the received signal.

For example, when the UE applies the FFT to only one of the repeated signals on the assumption that the received RS is repeatedly transmitted four times for a predetermined time period, the UE may not find an RE to/for which ZP CSI-RS is mapped/configured in the frequency domain, and therefore accurate SINR calculation may not be performed.

2.4. Fourth Operation Example

When only the CMR set is configured for the UE and (L1) SINR report is configured for the UE (e.g., ReportQuantity='cri-SINR'), the UE may measure the received power of a desired signal and interference signal received power based on the CMR. Then, the UE may calculate the SINR based on the two measured values.

As shown in FIG. 8, when the CMR (e.g., NZP CSI-RS resource) is configured at intervals of 4 REs in the frequency domain, the UE may acquire sufficient samples in the frequency domain, and perform more accurate channel estimation based thereon. In addition, after the channel estimation, the UE may remove a desired signal from an RE configured as a CMR with higher accuracy. Then, the UE may measure the interference signal received power based on the signal in the RE remaining after the removal.

Thus, according to the fourth operation example, an RE used for the interference estimation is not defined separately, and therefore RS overhead may be greatly reduced.

Figure 9:
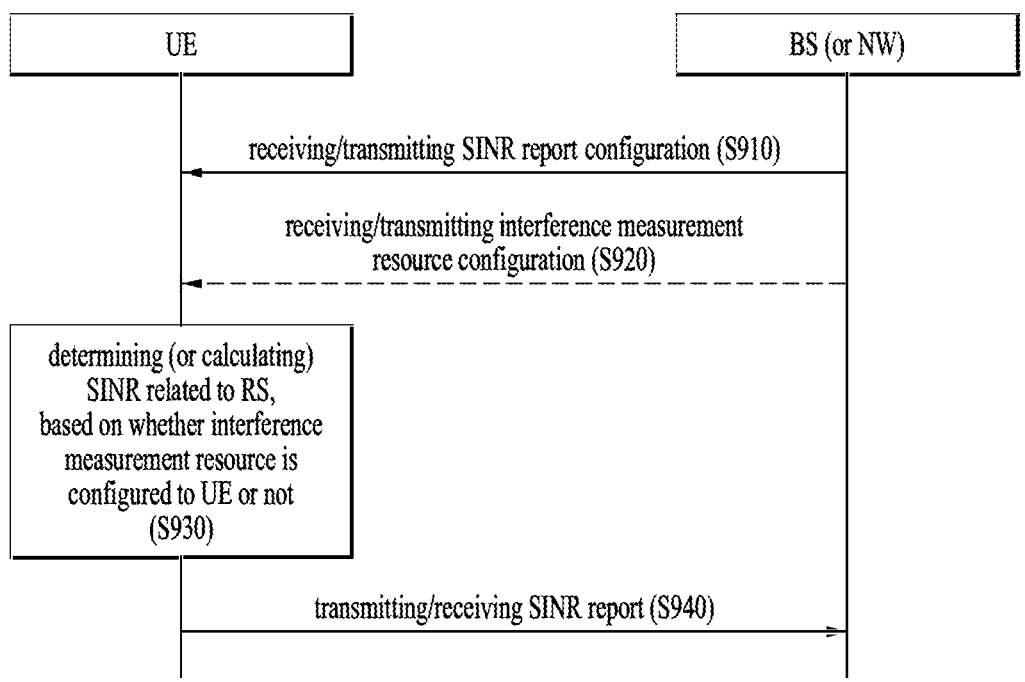
FIG. 9 is a diagram schematically illustrating an operation example of a UE and a base station according to an example of the present disclosure.
Figure 10:
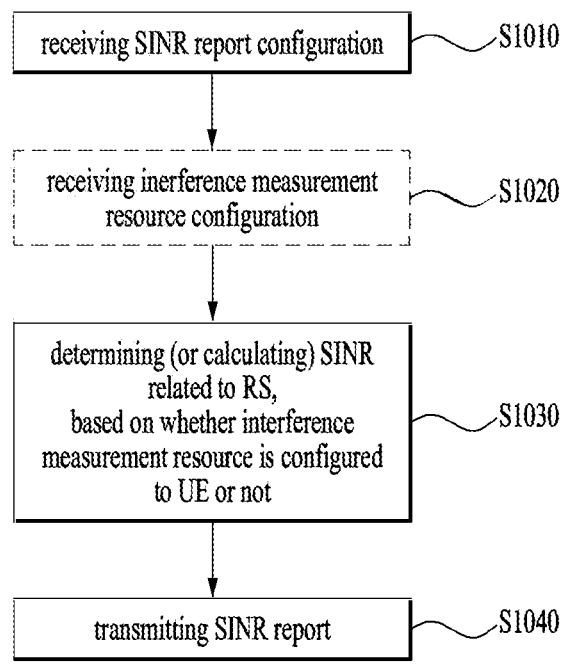
FIG. 10 is a flowchart schematically illustrating an operation example of a UE according to an example of the present disclosure.
Figure 11:
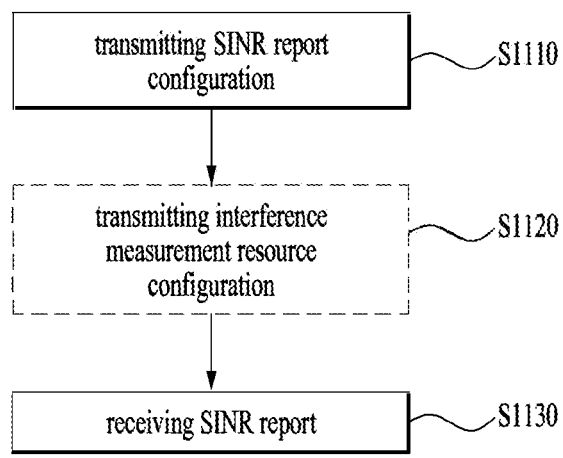
FIG. 11 is a flowchart schematically illustrating an operation example of a base station according to an example of the present disclosure.

FIG. 9 is a diagram schematically illustrating an operation example of a UE and a base station according to an example of the present disclosure, FIG. 10 is a flowchart schematically illustrating an operation example of a UE according to an example of the present disclosure, and FIG. 11 is a flowchart schematically illustrating an operation example of a base station according to an example of the present disclosure.

A UE according to the present disclosure may receive an SINR report configuration from a BS (S910, S1010). As a corresponding operation, the BS may transmit the SINR report configuration to the UE (S910, S1110).

As an example, the SINR report configuration may be transmitted and received through higher layer signaling (e.g., RRC signaling, etc.). As another example, the SINR report configuration may be transmitted and received through DCI.

The UE may or may not receive an interference measurement resource configuration from the BS (S920, S1020). More specifically, when the UE receives the interference measurement resource configuration from the BS, an interference measurement resource may be configured for the UE. On the other hand, when the UE does not receive the interference measurement resource configuration from the BS, no interference measurement resource may be configured for the UE. Thus, the BS may or may not transmit the interference measurement resource configuration to the UE (S920, S1120).

On the basis of the SINR report configuration, the UE may perform the following operations (S930, S1030).

(i) When an interference measurement resource related to a channel measurement RS resource is configured for the UE, an SINR related to the channel measurement RS resource may be calculated based on a first interference measurement result calculated based on the interference measurement resource.

(ii) Alternatively, when the interference measurement resource related to the channel measurement RS resource is not configured for the UE, an SINR related to the channel measurement RS resource may be calculated based on a second interference measurement result calculated based on the channel measurement RS resource.

The UE may report the SINR calculated with the above method to the BS (S940, S1040). In response, the BS may receive the calculated SINR report from the UE (S940, S1130).

In the configuration above, a channel measurement reference signal comprises a non-zero power channel state information-reference signal (NZP CSI-RS) or a synchronization signal/physical broadcast channel block, and the interference measurement resource may include a zero power (ZP) interference measurement resource or a non-zero interference measurement resource.

In the configuration above, the channel measurement RS resource and the interference measurement resource may be configured on one orthogonal frequency division multiplexing (OFDM) symbol.

To this end, the channel measurement RS resource and the interference measurement resource may be configured on the one OFDM symbol based on a frequency division multiplexing (FDM) scheme.

In the configuration above, the calculation of the SINR related to the channel measurement RS resource by the UE based on the first interference measurement result calculated based on the interference measurement resource may include calculating, by the UE, an SINR related to the channel measurement RS resource based on the first interference measurement result on an assumption that an RS received through the channel measurement RS resource is repeatedly transmitted once on the one OFDM symbol in the time domain.

In the configuration above, based on that the interference measurement resource is not configured for the UE, the UE refers to the channel measurement, the calculation of the SINR related to the channel measurement RS resource by the UE based on the second interference measurement result calculated based on the channel measurement RS resource may include the following operations:

performing channel estimation based on the channel measurement RS resource;
calculating the second interference measurement result by removing a desired signal detected through the channel estimation from the channel measurement RS resource; and
calculating an SINR related to the channel measurement RS resource based on the second interference measurement result.

Here, based on that the interference measurement resource is not configured for the UE, the channel measurement RS resource in one resource block (RB) may be configured on at least three subcarriers.

Alternatively, based on that the interference measurement resource is not configured for the UE, the channel measurement RS resource may be configured on a plurality of REs having a constant resource element (RE) interval on one orthogonal frequency division multiplexing (OFDM) symbol.

In the disclosure above, the SINR may include a first layer (L1)-SINR.

Since examples of the above-described proposal method may also be included in one of implementation methods of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the base station informs the UE of information as to whether the proposed methods are applied (or information about rules of the proposed methods) through a predefined signal (e.g., a physical layer signal or a higher-layer signal).

3. Example of Communication System to which the Present Disclosure Applies

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 12:
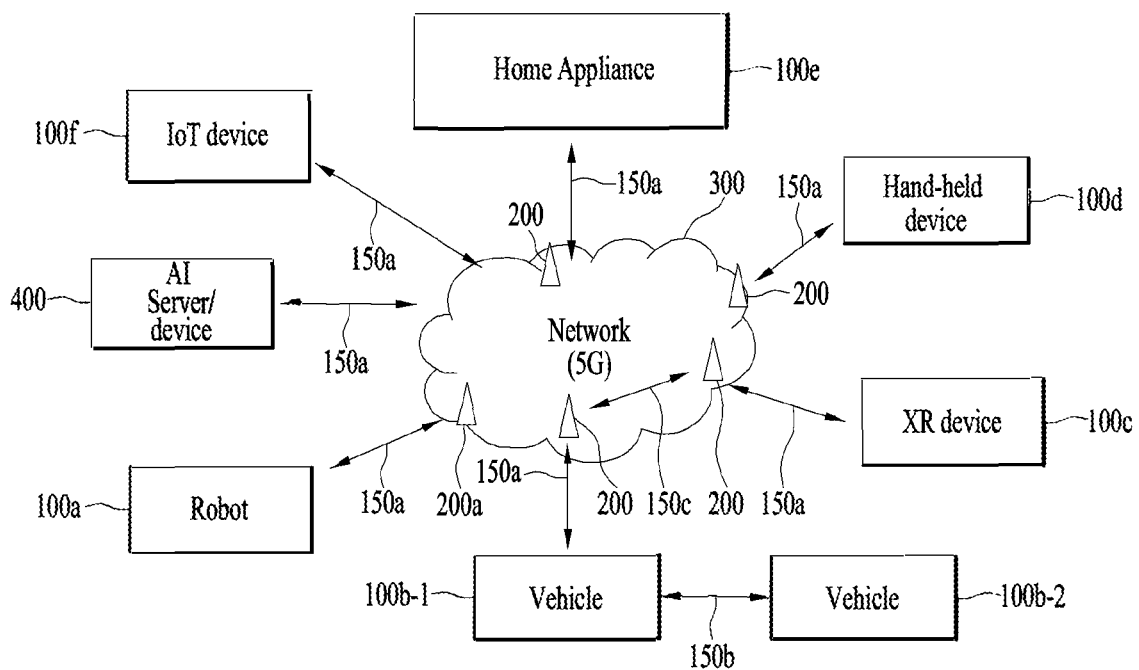
FIG. 12 illustrates a communication system applied to the present disclosure.

FIG. 12 illustrates a communication system 1 applied to the present disclosure.

Referring to FIG. 12, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the B Ss/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

4. Example of Wireless Device to which the Present Disclosure Applies

Figure 13:
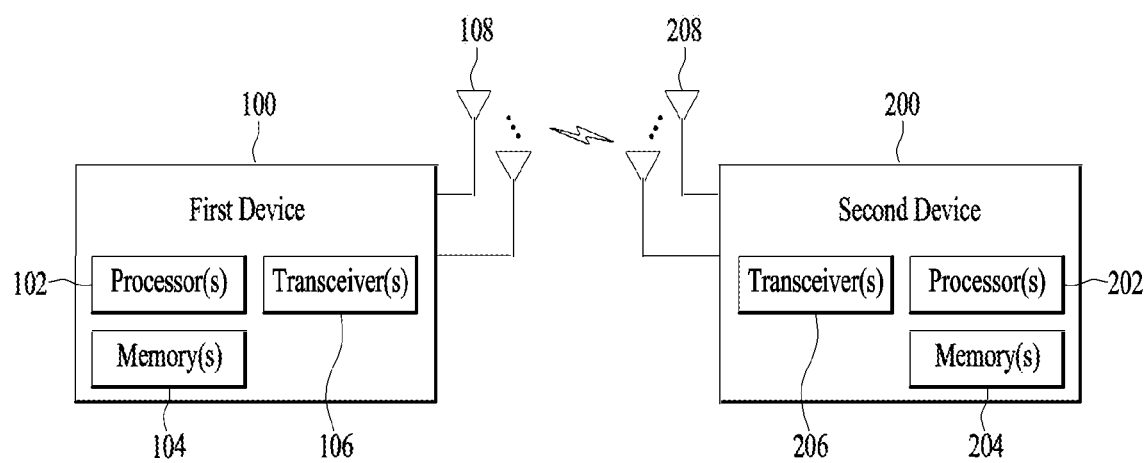
FIG. 13 illustrates an example of wireless devices applicable to the present disclosure.

FIG. 13 illustrates wireless devices applicable to the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

5. Usage Example of Wireless Device to which the Present Disclosure Applies

Figure 14:
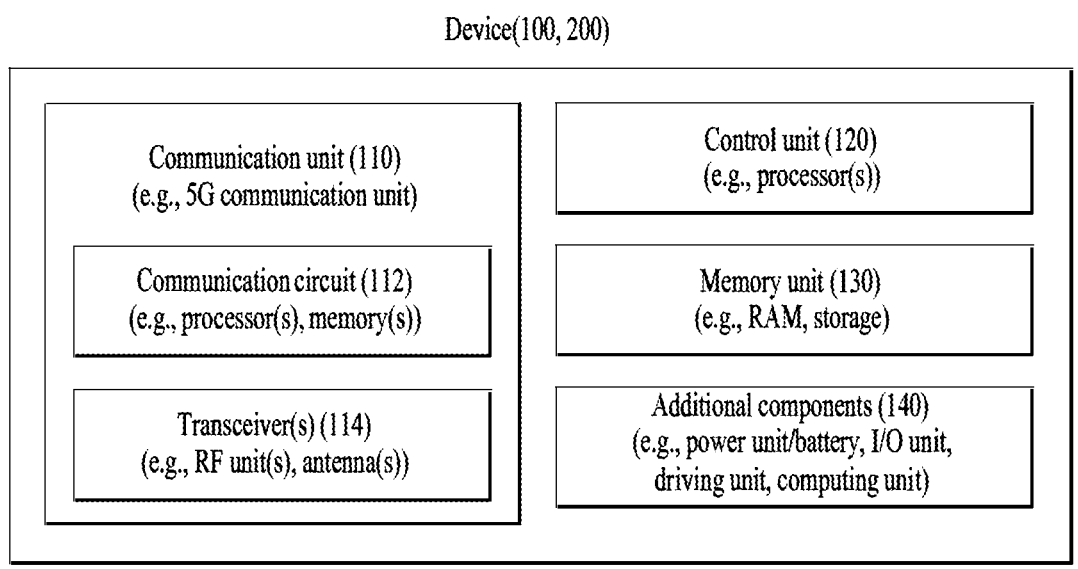
FIG. 14 illustrates another example of wireless devices applicable to the present disclosure.

FIG. 14 illustrates another example of a wireless device applied to the present disclosure. The wireless device may be implemented in various forms according to a use-case/service (refer to FIG. 12).

Referring to FIG. 14, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 14, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 14 will be described in detail with reference to the drawings.

5.1. Example of Mobile Device to Which the Present Disclosure Applies

Figure 15:
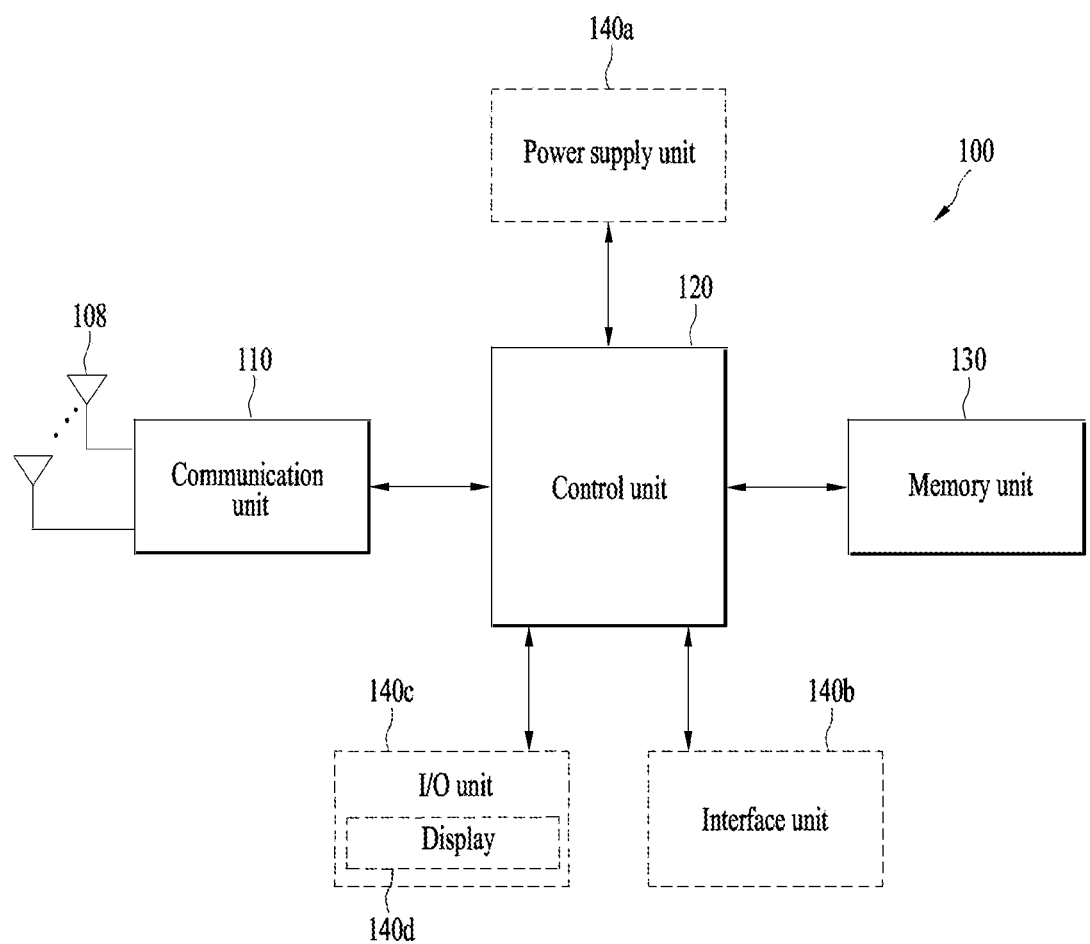
FIG. 15 illustrates a portable device applied to the present disclosure.

FIG. 15 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 15, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 14, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a B S. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 16:
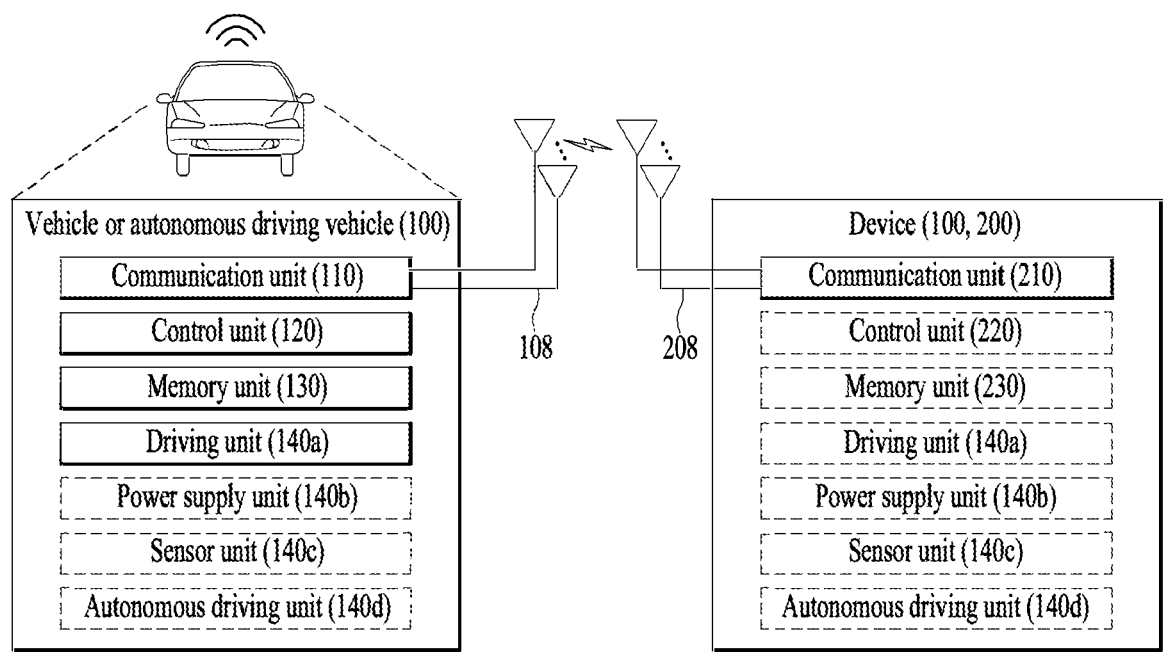
FIG. 16 illustrates a vehicle or autonomous driving vehicle applied to the present disclosure.

5.2. Examples of Vehicle or Autonomous Vehicle to Which the Present Disclosure Applies FIG. 16 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

Additionally, the embodiments of the present disclosure are applicable to various applications such as a self-driving vehicle, a UAV (unmanned Aerial Vehicle), etc.

The invention claimed is:

1. A method for operation of a user equipment (UE) in a wireless communication system, the method comprising:
   receiving from a base station, a signal to interference noise ratio (SINR) report configuration;
   determining a SINR related to a channel measurement reference signal resource; and
   reporting the SINR to the base station,
   wherein based on that both an interference measurement resource and the channel measurement reference signal resource are configured to the UE, the SINR is determined based on a first interference measurement result measured using the interference measurement resource, and
   wherein based on that the interference measurement resource is not configured to the UE and only the channel measurement reference signal resource is configured to the UE, the SINR is determined based on a second interference measurement result measured using the channel measurement reference signal resource.

2. The method of claim 1, wherein the SINR report configuration is received via a higher layer signaling.

3. The method of claim 1, wherein the channel measurement reference signal comprises (i) a non-zero power channel state information-reference signal (NZP CSI-RS) or (ii) a synchronization signal/physical broadcast channel block,
   wherein the interference measurement resource comprises (i) a zero power (ZP) interference measurement resource, or (ii) a non-zero interference measurement resource.

4. The method of claim 1, wherein based on that both the interference measurement resource and the channel measurement reference signal resource are configured to UE, the channel measurement reference signal resource and the interference measurement resource are configured on one orthogonal frequency division multiplexing (OFDM) symbol.

5. The method of claim 4, wherein the channel measurement reference signal resource and the interference measurement resource are configured on the one OFDM symbol based on a frequency division multiplexing (FDM) scheme.

6. The method of claim 4, wherein
   a reference signal received via the channel measurement reference signal resource is transmitted once on the one OFDM symbol in the time domain.

7. The method of claim 1, wherein based on that the interference measurement resource is not configured to the UE and only the channel measurement reference signal resource is configured to the UE, determining the SINR related to the channel measurement reference signal resource comprises:
   performing channel estimation based on the channel measurement reference signal resource;
   obtaining the second interference measurement result by removing a desired signal detected through the channel estimation from the channel measurement reference signal resource; and
   determining the SINK related to the channel measurement reference signal resource based on the second interference measurement result.

8. The method of claim 7, wherein the channel measurement reference signal resource is configured on at least three subcarriers in one resource block (RB).

9. The method of claim 7, wherein the channel measurement reference signal resource is configured on a plurality of resource elements (REs) having a constant resource element (RE) interval on one orthogonal frequency division multiplexing (OFDM) symbol.

10. The method of claim 1, wherein the SINR comprises a first layer (L1)-SINR.

11. A user equipment (UE) configured to operate in a wireless communication system, the UE comprising:
   at least one transmitter;
   at least one receiver;
   at least one processor; and
   at least one memory operatively coupled to the at least one processor, the at least one memory storing instructions configured to cause, when executed, the at least one processor to perform operating comprising:
   receiving from a base station, a signal to interference noise ratio (SINR) report configuration;
   determining a SINR related to a channel measurement reference signal resource; and
   reporting the SINR to the base station,
   wherein based on that both an interference measurement resource and the channel measurement reference signal resource are configured to the UE, the SINR is determined based on a first interference measurement result measured using the interference measurement resource, and wherein based on that the interference measurement resource is not configured to the UE and only the channel measurement reference signal resource is configured to the UE, the SINR is determined based on a second interference measurement result measured using the channel measurement reference signal resource.

12. The UE of claim 11, wherein the UE communicates with at least one of a mobile terminal, a network, or an autonomous vehicle other than a vehicle comprising the UE.

13. A base station configured to operate in a wireless communication system, the base station comprising:
- at least one transmitter;
- at least one receiver;
- at least one processor; and
- at least one memory operatively coupled to the at least one processor, the at least one memory storing instructions configured to cause, when executed, the at least one processor to perform operations comprising:

transmitting, to a user equipment (UE), a signal to interference noise ratio (SINR) report configuration; and receiving from the UE, an SINR, wherein based on that both an interference measurement resource and a channel measurement reference signal resource are configured to the UE, the SINR is determined based on a first interference measurement result measured using the interference measurement resource, and wherein based on that the interference measurement resource is not configured to the UE and only the channel measurement reference signal resource is configured to the UE, the SINR is determined based on a second interference measurement result measured using the channel measurement reference signal resource.

* * * * *